United States Patent
Pfeiffer et al.

(10) Patent No.: US 10,787,565 B2
(45) Date of Patent: *Sep. 29, 2020

(54) POLYMER COMPOSITION CONTAINING A CYCLOALKYL ALKYL DICARBOXYLIC ACID DIESTER AS A PLASTICIZER

(71) Applicant: BASF SE, Ludwigshafen am Rhein (DE)

(72) Inventors: Matthias Pfeiffer, Böhl-Iggelheim (DE); Boris Breitscheidel, Waldsee (DE); Axel Grimm, Edenkoben (DE); Herbert Morgenstern, Ellerstadt (DE); Martin Kaller, Mannheim (DE)

(73) Assignee: BASF SE, Ludwigshafen am Rhein (DE)

( * ) Notice: Subject to any disclaimer, the term of this patent is extended or adjusted under 35 U.S.C. 154(b) by 12 days.

This patent is subject to a terminal disclaimer.

(21) Appl. No.: 16/086,517

(22) PCT Filed: Mar. 22, 2017

(86) PCT No.: PCT/EP2017/056786
§ 371 (c)(1),
(2) Date: Sep. 19, 2018

(87) PCT Pub. No.: WO2017/162723
PCT Pub. Date: Sep. 28, 2017

(65) Prior Publication Data
US 2019/0048179 A1 Feb. 14, 2019

(30) Foreign Application Priority Data
Mar. 23, 2016 (EP) .................................... 16161873

(51) Int. Cl.
| | | |
|---|---|---|
| *C08L 27/06* | (2006.01) | |
| *C08K 5/11* | (2006.01) | |
| *C08K 5/12* | (2006.01) | |
| *C08K 5/00* | (2006.01) | |
| *C08K 5/10* | (2006.01) | |
| C08L 31/02 | (2006.01) | |
| C08L 71/00 | (2006.01) | |
| C08L 75/04 | (2006.01) | |
| C08L 81/06 | (2006.01) | |

(52) U.S. Cl.
CPC ............ *C08L 27/06* (2013.01); *C08K 5/0016* (2013.01); *C08K 5/10* (2013.01); *C08K 5/11* (2013.01); *C08K 5/12* (2013.01); *C08K 2201/014* (2013.01); *C08L 31/02* (2013.01); *C08L 71/00* (2013.01); *C08L 75/04* (2013.01); *C08L 81/06* (2013.01); *C08L 2203/02* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 2,921,089 A | 1/1960 | Hagemeyer, Jr. et al. | |
| 3,418,351 A | 12/1968 | Greene et al. | |
| 3,932,523 A | 1/1976 | Strohmeyer et al. | |
| 4,009,124 A | 2/1977 | Laurer et al. | |
| 4,148,830 A | 4/1979 | Pruett et al. | |
| 4,426,524 A | 1/1984 | Plummer | |
| 5,013,780 A * | 5/1991 | Fariss ...................... C08K 5/11 |
| | | | 524/314 |
| 5,288,918 A | 2/1994 | Maher et al. | |
| 5,324,853 A | 6/1994 | Jones et al. | |
| 5,434,313 A | 7/1995 | Harrison et al. | |
| 5,696,297 A | 12/1997 | Kneuper et al. | |
| 5,849,972 A | 12/1998 | Vicari et al. | |
| 6,225,507 B1 | 5/2001 | Giessler et al. | |
| 6,310,235 B1 | 10/2001 | Gick | |
| 6,310,261 B1 | 10/2001 | Geissler et al. | |
| 6,437,170 B1 | 8/2002 | Thil et al. | |
| 6,723,884 B1 | 4/2004 | Grenacher et al. | |
| 6,765,119 B2 | 7/2004 | Hoffmann et al. | |
| 7,173,138 B2 | 2/2007 | Ahlers et al. | |
| 7,385,075 B2 | 6/2008 | Disteldorf et al. | |
| 9,676,923 B2 | 6/2017 | Facklam | |
| 2004/0198909 A1 * | 10/2004 | Breitscheidel .... B32B 17/10761 |
| | | | 525/165 |
| 2017/0145186 A1 | 5/2017 | Pfeiffer et al. | |
| 2017/0145187 A1 | 5/2017 | Pfeiffer et al. | |
| 2017/0233548 A1 | 8/2017 | Pfeiffer et al. | |
| 2018/0282510 A1 | 10/2018 | Pfeiffer et al. | |

FOREIGN PATENT DOCUMENTS

| | | |
|---|---|---|
| DE | 1593368 A1 | 7/1970 |
| DE | 1945359 A1 | 3/1971 |
| DE | 2139630 A1 | 2/1973 |
| DE | 2244373 A1 | 4/1974 |
| DE | 2404855 A1 | 8/1975 |
| DE | 2445303 A1 | 4/1976 |
| DE | 2612355 A1 | 10/1977 |
| DE | 2628987 A1 | 1/1978 |
| DE | 3228881 A1 | 2/1984 |
| DE | 4339713 A1 | 5/1995 |
| EP | 366089 A2 | 5/1990 |
| EP | 432124 A2 | 6/1991 |

(Continued)

OTHER PUBLICATIONS

U.S. Appl. No. 16/071,249, filed Jul. 19, 2018.
International Preliminary Examination Report for PCT/EP2017/056786 dated Jul. 27, 2018 with Applicant Response (in German).
International Search Report for PCT/EP2017/056786 dated Nov. 9, 2017.
Written Opinion of the International Searching Authority for PCT/EP2017/056786 dated Nov. 9, 2017.

*Primary Examiner* — Robert T Butcher
(74) *Attorney, Agent, or Firm* — Faegre Drinker Biddle & Reath LLP

(57) ABSTRACT

The present invention relates to a polymer composition comprising a cycloalkyl alkyl dicarboxylic diester as plasticizer, to molding compositions and plastisols each comprising such a polymer composition, and to the use of these polymer compositions.

22 Claims, 9 Drawing Sheets

(56) References Cited

FOREIGN PATENT DOCUMENTS

| | | | |
|---|---|---|---|
| EP | 0513470 | A2 | 11/1992 |
| EP | 695734 | A1 | 2/1996 |
| EP | 880494 | B1 | 5/2000 |
| EP | 1047655 | B1 | 5/2003 |
| EP | 2258760 | A1 | 12/2010 |
| EP | 2631267 | A1 | 8/2013 |
| GB | 1579159 | A | 11/1980 |
| RU | 2569645 | C2 | 11/2015 |
| WO | WO-95014647 | A1 | 6/1995 |
| WO | WO-9730016 | A1 | 8/1997 |
| WO | WO-9823566 | A1 | 6/1998 |
| WO | WO-0063151 | A1 | 10/2000 |
| WO | WO-2001014297 | A1 | 3/2001 |
| WO | WO-200187809 | A1 | 11/2001 |
| WO | WO-2002038531 | A1 | 5/2002 |
| WO | WO-2002083695 | A1 | 10/2002 |
| WO | WO-05028407 | A1 | 3/2005 |
| WO | WO-2016005357 | A1 | 1/2016 |

\* cited by examiner

POLYMER COMPOSITION CONTAINING A CYCLOALKYL ALKYL DICARBOXYLIC ACID DIESTER AS A PLASTICIZER

CROSS-REFERENCE TO RELATED APPLICATIONS

This application is a national stage application (under 35 U.S.C. § 371) of PCT/EP2017/056786, filed Mar. 22, 2017, which claims benefit of European Application No. 16161873.1, filed Mar. 23, 2016, both of which are incorporated herein by reference in their entirety.

BACKGROUND OF THE INVENTION

The present invention relates to a polymer composition comprising a cycloalkyl alkyl dicarboxylic diester as plasticizer, to molding compositions and plastisols each comprising such a polymer composition, and to the use of these polymer compositions.

PRIOR ART

Desired processing properties or desired performance characteristics are achieved in many plastics by adding what are known as plasticizers in order to render the plastics softer, more flexible and/or more extensible. The use of plasticizers generally serves to shift the thermoplastic region of plastics to lower temperatures, so as to obtain the desired elastic properties at lower processing temperatures and lower usage temperatures.

Production quantities of polyvinyl chloride (PVC) are among the highest of any plastic. Because this material is versatile, it is nowadays found in a wide variety of products used in everyday life. PVC therefore has very great economic importance. PVC is intrinsically a plastic that is hard and brittle up to about 80° C., and is used in the form of rigid PVC (PVC-U) by adding heat stabilizers and other additives. Flexible PVC (PVC-P) is obtained only by adding suitable plasticizers, and can be used for many applications for which rigid PVC is unsuitable.

The suitability of any substance for use as plasticizer for a particular polymer depends substantially on the properties of the polymer to be plasticized. Desirable plasticizers are generally those which have high compatibility with the polymer to be plasticized, endow it with good thermoplastic properties, and have only low susceptibility to loss by evaporation and/or by exudation (have high permanence).

There are many different compounds marketed for plasticizing PVC and other plastics. Phthalic diesters with alcohols of different chemical structure have in the past often been used as plasticizers because they have good compatibility with PVC and advantageous performance characteristics, examples being diethylhexyl phthalate (DEHP), diisononyl phthalate (DINP) and diisodecyl phthalate (DIDP). Short-chain phthalates, e.g. dibutyl phthalate (DBP), diisobutyl phthalate (DIBP), benzyl butyl phthalate (BBP) or diisoheptyl phthalate (DIHP), are also used as fast fusers, for example in the production of what are known as plastisols. It is also possible to use dibenzoic esters, such as dipropylene glycol dibenzoates, for the same purpose alongside the short-chain phthalates. Phenyl and cresyl esters of alkylsulfonic acids are examples of another class of plasticizers with good gelling properties, and are obtainable with trademark Mesamoll®.

Plastisols initially are a suspension of finely pulverulent plastics in liquid plasticizers. The solvation rate of the polymer in the plasticizer here is very low at ambient temperature. The polymer is noticeably solvated in the plasticizer only on heating to relatively high temperatures. The individual isolated polymer aggregates here swell and fuse to give a three-dimensional high-viscosity gel. This procedure is termed gelling, and begins at a certain minimum temperature which is termed gelling point or solvation temperature. The gelling step is not reversible.

Since plastisols take the form of liquids, they are very often used for the coating of a very wide variety of materials, e.g. textiles, glass nonwovens, etc. This coating is very often composed of a plurality of sublayers.

In a procedure often used in the industrial processing of plastisol products, a layer of plastisol is therefore applied and directly thereafter the plastic, in particular PVC, with the plasticizer is subjected to incipient gelling above the solvation temperature, thus producing a solid layer composed of a mixture of gelled, partially gelled, and ungelled polymer particles. The next sublayer is then applied to this incipiently gelled layer, and once the final layer has been applied the entire structure is processed in its entirety to give the fully gelled plastics product by heating to relatively high temperatures.

Another possibility, alongside production of plastisols, is production of dry pulverulent mixtures of plasticizer and plastics. These dry blends, in particular based on PVC, can then be further processed at elevated temperatures for example by extrusion to give pellets, or processed through conventional shaping processes, such as injection molding, extrusion, or calendering, to give the fully gelled plastics product.

Plasticizers with good gelling properties are additionally required because of increasing technical and economic demands on the processing of thermoplastic polymers and elastomers.

In particular in the production and processing of PVC plastisols, for example for producing PVC coatings, it is inter alia desirable to have available, as fast fuser, a plasticizer with low gelling point. High storage stability of the plastisol is moreover also desirable, i.e. the ungelled plastisol is intended to exhibit no, or only a slight, viscosity rise over the course of time at ambient temperature. As far as possible, these properties are intended to be achieved by addition of a suitable plasticizer with rapid-gelling properties, with no need for the use of other viscosity-reducing additives and/or of solvents.

However, fast fusers generally often have unsatisfactory compatibility with the additized polymers. Furthermore, they usually exhibit high volatility both on processing and in use of the final products. Moreover, the addition of fast fusers in many cases has a deleterious effect on the mechanical properties of the final products. Another known method for establishing the desired plasticizer properties is therefore to use mixtures of plasticizers, e.g. at least one plasticizer which provides good thermoplastic properties but provides relatively poor gelling, in combination with at least one fast fuser.

To bring about the desired plasticizer properties, the prior art discloses various alternative plasticizers with different properties for a variety of plastics and specifically for PVC. Additionally it is known practice to use mixtures of plasticizers, for example at least one plasticizer which imparts good thermoplastic properties but which gels less well, in combination with at least one plasticizer which imparts good gelling properties.

EP 2631267 A1 discloses succinic acid alkyl ester mixtures of plasticizers for plastics, particularly for PVC. It uses mixtures of at least two succinic acid alkyl diesters, based on two different, monofunctional, straight-chain or branched alcohols.

EP 432124 B1 discloses the use of dicyclohexyl adipate in mixtures with polyvinyl butyral. Disclosed therein more particularly are the advantages of a combination of mixed esters of adipic acid with polyvinyl butyral by comparison with the pure diesters, such as dicyclohexyl adipate, for example. These mixtures are used as an interlayer in safety glazing, and have the advantage of improved UV stability, reduced delamination tendency at the edges of the glass/polymer composite, and improved impact absorption.

It is an object of the present invention to provide a polymer composition for thermoplastic polymers and elastomers. The polymer composition is to endow molding compositions, plastisols and PVC compositions, on the one hand with good thermoplastic properties and on the other hand with good gelling properties, i.e., a gelling temperature which is as low as possible. The polymer composition is intended as a result to be suitable particularly for the provision of plastisols. The polymer composition is to exhibit high compatibility with the polymer to be plasticized, is to possess high permanence, and is, moreover, to exhibit low volatility both on processing and during the use of the final products. There is also a need for plasticizers which in particular are toxicologically unobjectionable. This applies especially to sensitive application sectors such as children's toys, food packaging or medical items.

SUMMARY OF THE INVENTION

One subject of the present invention are polymer compositions comprising

A) one or more polymer(s) selected from PVC homopolymers and copolymers, with the proviso that the polymer composition comprises 50 to 100% by weight, based on the total amount of polymers in the polymer composition, with at least one polymer which is selected from PVC homopolymers and copolymers, and B1) one or more compound(s) of the formula (I)

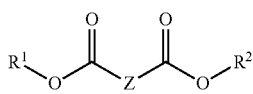

in which
Z is an unbranched or branched $C_2$-$C_8$-alkylene group or is an unbranched or branched $C_2$-$C_8$-alkenylene group, comprising at least one double bond, and
$R^1$ is a saturated, unbranched or branched $C_4$-$C_{12}$-alkyl moiety, and
$R^2$ is a saturated $C_3$-$C_8$-cycloalkyl moiety, the cycloalkyl moieties mutually independently being either unsubstituted or substituted by at least one $C_1$-$C_{10}$-alkyl moiety.

A further subject of the invention are polymer compositions comprising

A) one or more polymer component(s) selected from thermoplastic polymers and elastomers and also mixtures thereof, B1) one or more compound(s) of the formula (I)

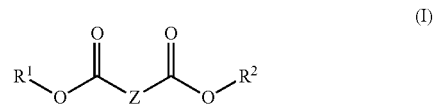

B2) optionally one or more compound(s) of the formula (II.a)

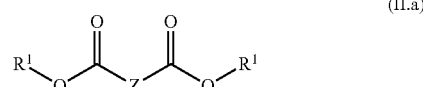

B3) optionally one or more compound(s) of the formula (II.b)

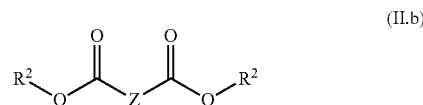

in which
Z is an unbranched or branched $C_2$-$C_8$-alkylene group or is an unbranched or branched $C_2$-$C_8$-alkenylene group, comprising at least one double bond, and
$R^1$ is a saturated, unbranched or branched $C_4$-$C_{12}$-alkyl moiety, and
$R^2$ is a saturated $C_3$-$C_8$-cycloalkyl moiety, the cycloalkyl moieties mutually independently being either unsubstituted or substituted by at least one $C_1$-$C_{10}$-alkyl moiety,
and
C) one or more further plasticizer(s) selected from
1,2-cyclohexanedicarboxylic diesters,
phthalic diesters,
terephthalic diesters.

A further subject of the invention are molding compositions consisting of or comprising a polymer composition as defined herein.

A further subject of the invention are plastisols consisting of or comprising a polymer composition as defined herein.

A further subject of the invention is the use of a polymer composition as defined herein as plasticizer for thermoplastic polymers and elastomers.

A further subject of the invention is the use of a polymer composition as defined herein in plastisols.

A further subject of the invention is the use of a polymer composition as defined herein in molding compositions.

A further subject of the invention is the use of a polymer composition as defined herein for producing moldings and foils.

DESCRIPTION OF THE INVENTION

The polymer compositions of the invention have the following advantages:
The polymer compositions of the invention feature high compatibility with the polymer to be plasticized, in particular PVC.
The polymer compositions of the invention possess high permanence. The polymer compositions of the invention therefore display low volatility both on processing and during use of the final products.

The polymer compositions of the invention have advantageous suitability for achieving a wide variety of very different and complex processing properties and usage properties of plastics.

The polymer composition of the invention is advantageously suitable for the production of plastisols.

The polymer compositions of the invention are suitable for the use for the production of moldings and foils for sensitive application sectors, such as medical products, packaging for food and drink, products for the interior sector, for example in dwellings and in vehicles; other examples are toys, childcare items, etc.

The compounds comprised in the polymer compositions of the invention can be produced using readily obtainable starting materials.

The processes for the production of the compounds used according to the invention are simple and efficient, and these can therefore be provided without difficulty on a large industrial scale.

For the purposes of the present invention, unless otherwise indicated, PVC stands for polyvinyl chloride, encompassing polyvinyl chloride homopolymers and polyvinyl chloride copolymers.

For the purposes of the present invention, the expression fast fuser means a plasticizer which has a solvation temperature in accordance with DIN 53408:1967-06 below 120° C. These fast fusers are in particular used for the production of plastisols.

For the purposes of the present invention, the abbreviation phr (parts per hundred resin) used above or below stands for parts by weight of plasticizer per hundred parts by weight of polymer.

For the purposes of the invention, the prefix $C_n$-$C_m$ indicates the number of carbon atoms which a molecule or group identified accordingly can have.

For the purposes of the present invention, the expression "$C_4$-$C_{12}$-alkyl" encompasses unbranched or branched alkyl groups having 4, 5, 6, 7, 8, 9, 10, 11 or 12 carbon atoms. Examples include n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 1-ethylbutyl, 2-ethylbutyl, n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl, and the structural isomers thereof.

$C_4$-$C_{12}$-alkyl preferred in one embodiment comprises branched or unbranched $C_7$-$C_{12}$-alkyl groups, such as n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl, and the like.

For the purposes of the present invention, the expression "$C_1$-$C_{10}$-alkyl" encompasses straight-chain and branched $C_1$-$C_{10}$-alkyl groups, examples being methyl, ethyl, propyl, butyl, pentyl, hexyl, heptyl, octyl, nonyl and decyl and the structural isomers thereof.

For the purposes of the present invention, the expression "$C_3$-$C_8$-cycloalkyl" encompasses saturated cyclic hydrocarbons having 3, 4, 5, 6, 7 or 8 carbon atoms. These include cyclopropyl, cyclobutyl, cyclopentyl, cyclohexyl, cycloheptyl, and cyclooctyl.

$C_3$-$C_8$-Cycloalkyl preferred in one embodiment are $C_5$-$C_7$-cycloalkyl, such as cyclopentyl, cyclohexyl, and cycloheptyl.

The cycloalkyl groups may be unsubstituted or substituted.

Depending on their ring size, substituted cycloalkyl groups may have one or more, as for example 1, 2, 3, 4 or 5, $C_1$-$C_{10}$-alkyl substituents. These $C_1$-$C_{10}$-alkyl groups are in each case mutually independently selected from straight-chain and branched $C_1$-$C_{10}$-alkyl groups, examples being ethyl, methyl, n-propyl, isopropyl, n-butyl, isobutyl, sec-butyl, tert-butyl, n-pentyl, n-hexyl, n-heptyl, n-octyl, n-nonyl, n-decyl, and the structural isomers thereof.

Examples of substituted $C_5$-$C_7$-cycloalkyl groups are 2-methylcyclopentyl, 3-methylcyclopentyl, 2-methylcyclohexyl, 3-methylcyclohexyl, 4-methylcyclohexyl, 2-methylcycloheptyl, 3-methylcycloheptyl, 4-methylcycloheptyl, 2-ethylcyclopentyl, 3-ethylcyclopentyl, 2-ethylcyclohexyl, 3-ethylcyclohexyl, 4-ethylcyclohexyl, 2-ethylcycloheptyl, 3-ethylcycloheptyl, 4-ethylcycloheptyl. Preferred are 2-methylcyclopentyl, 2-methylcyclohexyl, and 2-methylcycloheptyl.

For the purposes of the present invention, the expression "unbranched or branched $C_2$-$C_8$-alkylene group" encompasses unbranched or branched, divalent hydrocarbon groups having 2, 3, 4, 5, 6, 7 or 8 carbon atoms. Examples include 1,2-ethylene, 1,2-propylene, 1,3-propylene, 1,3-butylene, 1,4-butylene, 2-methyl-1,3-propylene, 1,1-dimethyl-1,2-ethylene, 1,4-pentylene, 1,5-pentylene, 2-methyl-1,4-butylene, 2,2-dimethyl-1,3-propylene, 1,6-hexylene, 2-methyl-1,5-pentylene, 3-methyl-1,5-pentylene, 2,3-dimethyl-1,4-butylene, 1,7-heptylene, 2-methyl-1,6-hexylene, 3-methyl-1,6-hexylene, 2-ethyl-1,5-pentylene, 3-ethyl-1,5-pentylene, 2,3-dimethyl-1,5-pentylene, 2,4-dimethyl-1,5-pentylene, 1,8-octylene, 2-methyl-1,7-heptylene, 3-methyl-1,7-heptylene, 4-methyl-1,7-heptylene, 2-ethyl-1,6-hexylene, 3-ethyl-1,6-hexylene, 2,3-dimethyl-1,6-hexylene, 2,4-dimethyl-1,6-hexylene, and the like.

$C_2$-$C_8$-Alkylene groups preferred in one embodiment are $C_3$-$C_5$-alkylene groups.

For the purposes of the present invention, the expression "unbranched or branched $C_2$-$C_8$-alkenylene group" encompasses unbranched or branched, divalent hydrocarbon groups having 2, 3, 4, 5, 6, 7 or 8 carbon atoms, the main chain having at least one double bond. Examples include ethenylene, propenylene, 1-methylethenylene, 1-butenylene, 2-butenylene, 1-methylpropenylene, 2-methylpropenylene, 1-pentenylene, 2-pentenylene, 1-methyl-1-butenylene, 1-methyl-2-butenylene, 1-hexenylene, 2-hexenylene, 3-hexenylene, 1-methyl-1-pentenylene, 1-methyl-2-pentenylene, 1-methyl-3-pentenylene, 1,4-dimethyl-1-butenylene, 1,4-dimethyl-2-butenylene, and the like.

$C_2$-$C_8$-Alkenylene groups preferred in one embodiment are $C_2$-$C_4$-alkenylene groups having one double bond.

The double bonds in the alkenylene groups may be present mutually independently in the E or Z configuration or as a mixture of both configurations.

In the case of the singly or multiply branched alkylene groups and alkenylene groups, the carbon atom at the branching point or the carbon atoms at the respective branching points, mutually independently, may have an R or an S configuration or both configurations in equal or different proportions.

Component B1, B2 and B3

Component B) comprises the components B1) and optionally B2) and optionally B3).

The plasticizer component B) therefore comprises
B1) one or more compound(s) of the formula (I)
and optionally
B2) one or more compound(s) of the formula (II.a)
and optionally
B3) one or more compound(s) of the formula (II.b),
where the compounds of the formulae (I), (II.a) and (II.b) are as defined herein.

In the compounds of the formulae (I), (II.a) and (II.b), in accordance with the invention, Z is an unbranched or branched $C_2$-$C_8$-alkylene group or is an unbranched or branched $C_2$-$C_8$-alkenylene group, comprising at least one double bond, $R^1$ is a saturated, unbranched or branched $C_4$-$C_{12}$-alkyl moiety, and $R^2$ is a saturated $C_3$-$C_8$-cycloalkyl group, the cycloalkyl moieties mutually independently being either unsubstituted or substituted by at least one $C_1$-$C_{10}$-alkyl moiety.

Preferably Z is an unbranched or branched $C_2$-$C_8$-alkylene group, more preferably an unbranched or branched $C_3$-$C_8$-alkylene group. The unbranched groups are preferred here in each case.

More preferably Z is 1,3-propylene, 1,4-butylene, 1,5-pentylene, 1,6-hexylene, 1,7-heptylene, or 1,8-octylene. Especially preferred is 1,4-butylene.

$R^1$ is preferably a saturated, unbranched or branched $C_7$-$C_{12}$-alkyl group.

More preferably $R^1$ is n-octyl, n-nonyl, isononyl, 2-ethylhexyl, isodecyl, 2-propylheptyl, n-undecyl, or isoundecyl. Especially preferred is 2-ethylhexyl, isononyl, or 2-propylheptyl, specifically 2-ethylhexyl or isononyl.

Preferably $R^2$ is a saturated $C_5$-$C_7$-cycloalkyl group, the cycloalkyl moieties mutually independently being either unsubstituted or substituted by at least one $C_1$-$C_{10}$-alkyl moiety.

More preferably $R^2$ is cyclopentyl, cyclohexyl, cycloheptyl, 2-methylcyclopentyl, 2-methylcyclohexyl, or 2-methylcycloheptyl, especially preferably cyclopentyl, cyclohexyl, cycloheptyl, or 2-methylcyclohexyl, specifically cyclohexyl or 2-methylcyclohexyl.

In a first embodiment the polymer composition comprises exclusively compounds of the formula (I) as plasticizers.

In a second embodiment the polymer composition comprises compounds of the formulae (I) (II.a) and/or (II.b) as plasticizers. Preferably the composition comprises compounds of the formulae (I) (II.a) and (II.b) as plasticizers.

In a preferred embodiment the plasticizer component B) comprises
B1) one or more compound(s) of the formula (I)
B2) one or more compound(s) of the formula (II.a), and
B3) one or more compound(s) of the formula (II.b),
the compounds of the formulae (I), (II.a) and (II.b) being as defined herein.

In the compounds of the formulae (I) (II.a) and (II.b) the groups Z, $R^1$ and $R^2$ in each case are identical to or different from one another. Preferably the groups Z are identical. More preferably the groups Z and $R^2$ are each identical. Especially preferably the groups Z, $R^1$ and $R^2$ in each case are identical.

In one embodiment the polymer composition comprises precisely one compound of the formula (I), precisely one compound of the formula (II.a), and precisely one compound of the formula (II.b). In this case the groups Z, $R^1$ and $R^2$ in each case may be identical to or different from one another. The groups Z are preferably identical. More preferably the groups Z and $R^2$ are each identical. Especially preferably the groups Z, $R^1$ and $R^2$ are identical in each case.

By modifying the proportions of the compounds of the formulae (I), (II.a) and (II.b) in the polymer composition it is possible to tailor the plasticizer properties to the corresponding end use.

Where the polymer composition includes at least one compound of the formula (II.a) and/or (II.b) in addition to the at least one compound of the formula (I), the amount of compounds of the general formula (I) in the polymer composition is preferably 10 to 75% by weight, more preferably 20 to 65% by weight, and more particularly 30 to 60% by weight, based on the total amount of the compounds of the formulae (I), (II.a) and (II.b) in the polymer composition.

Where the polymer composition includes at least one compound of the formula (II.a) or (II.b) in addition to the at least one compound of the formula (I), the amount of compounds of the general formulae (II.a) and (II.b) in the polymer composition is preferably 25 to 90% by weight, more preferably 35 to 80% by weight, and more particularly 40 to 70% by weight, based on the total amount of the compounds of the formulae (I), (II.a) and (II.b) in the polymer composition.

Where the polymer composition includes at least one compound of the formula (II.a) or (II.b) in addition to the at least one compound of the formula (I), the weight ratio between compounds of the formula (I) and compounds of the formulae (II.a) and (II.b) is preferably in the range from 10:90 to 75:25, more preferably in the range from 20:80 to 65:35, and more particularly in the range from 30:70 to 60:40.

Component C)

For use in specific fields of application, it may optionally be useful to add further plasticizers, different from component B, in other words from the compounds of the formulae (I), (II.a) and (II.b), to the polymer compositions of the invention. For this reason, the polymer composition of the invention may optionally comprise a plasticizer component C) which comprises one or more further plasticizers selected from C1) dialkyl 1,2-cyclohexanedicarboxylates,
C2) dialkyl phthalates, and
C3) dialkyl terephthalates.

Suitable compounds C1), C2), and C3) are those identified below.

Suitable 1,2-cyclohexanedicarboxylic diesters are compounds of the general formula (III.a),

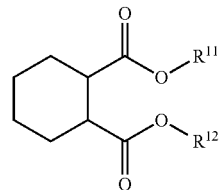

(III.a)

in which $R^{11}$ and $R^{12}$ independently of one another are selected from branched and unbranched $C_7$-$C_{12}$-alkyl moieties.

Preferably, in the compounds of the formula (III.a), the moieties $R^{11}$ and $R^{12}$ independently of one another are n-octyl, n-nonyl, isononyl, 2-ethylhexyl, isodecyl, 2-propylheptyl, n-undecyl or isoundecyl.

In the compounds of the formula (III.a), the moieties $R^{11}$ and $R^{12}$ are more preferably identical. Especially preferably in the compounds of the formula (III.a) the moieties $R^{11}$ and $R^{12}$ are both 2-ethylhexyl, both isononyl, or both 2-propylheptyl.

One especially preferred compound of the formula (III.a) is diisononyl 1,2-cyclohexanedicarboxylate.

Suitable phthalic diesters are compounds of the general formula (III.b),

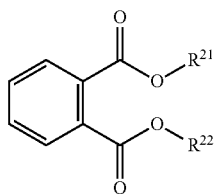

(III.b)

in which $R^{21}$ and $R^{22}$ independently of one another are selected from branched and unbranched $C_9$-$C_{12}$-alkyl moieties.

In the compounds of the general formula (III.b), the moieties $R^{21}$ and $R^{22}$ independently of one another are preferably n-nonyl, isononyl, n-decyl, isodecyl, 2-propylheptyl, 2-propyl-4-methylhexyl, 2-propyl-5-methylhexyl, 2-isopropylheptyl, 2-isopropyl-4-methylhexyl, 2-isopropyl-5-methylhexyl, 2-propyl-4,4-dimethylpentyl, n-undecyl, isoundecyl, n-dodecyl or isododecyl, more preferably 2-propylheptyl, 2-propyl-4-methylhexyl, 2-propyl-5-methylhexyl, 2-isopropylheptyl, 2-isopropyl-4-methylhexyl, 2-isopropyl-5-methylhexyl or 2-propyl-4,4-dimethylpentyl, and more particularly 2-propylheptyl.

With particular preference the moieties $R^{21}$ and $R^{22}$ in the compounds of the formula (III.b) are identical. Especially preferably in the compounds of the formula (III.b) the moieties $R^{21}$ and $R^{22}$ are both 2-propylheptyl, both 2-propyl-4-methylhexyl, both 2-propyl-5-methylhexyl, both 2-isopropylheptyl, both 2-isopropyl-4-methylhexyl, both 2-isopropyl-5-methylhexyl, or both 2-propyl-4,4-dimethylpentyl.

One especially preferred compound of the formula (III.b) is di(2-propylheptyl) phthalate.

Suitable terephthalic diesters are compounds of the general formula (III.c),

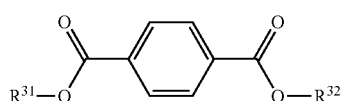

(III.c)

in which $R^{31}$ and $R^{32}$ independently of one another are selected from branched and unbranched $C_4$-$C_{12}$-alkyl moieties.

Preferably, in the compounds of the formula (II.c), the moieties $R^{31}$ and $R^{32}$ independently of one another are $C_7$-$C_{12}$-alkyl, more particularly n-heptyl, n-octyl, n-nonyl, isononyl, 2-ethylhexyl, isodecyl, 2-propylheptyl, n-undecyl, or isoundecyl.

More preferably in the compounds of the formula (III.c), the moieties $R^{31}$ and $R^{32}$ are both $C_7$-$C_{12}$-alkyl. Especially preferably in the compounds of the formula (III.c) the moieties $R^{31}$ and $R^{32}$ are both 2-ethylhexyl, both isononyl, or both 2-propylheptyl.

One especially preferred compound of the formula (III.c) is di(2-ethylhexyl) terephthalate.

In one embodiment the polymer composition contains no plasticizer component C). It therefore contains no plasticizer selected from 1,2-cyclohexanedicarboxylic diesters, phthalic diesters, and terephthalic diesters.

In another embodiment the polymer composition comprises a plasticizer component C) comprising one or more plasticizers selected from 1,2-cyclohexanedicarboxylic diesters, phthalic diesters, and terephthalic diesters.

Where the polymer composition includes a plasticizer component C), the amount of the plasticizer component C) in the polymer composition is preferably 1 to 90% by weight, more preferably 10 to 80% by weight, and more particularly 20 to 70% by weight, based on the total amount of the components B) and C) in the polymer composition.

In one embodiment the plasticizer component C) comprises a mixture of 1,2-cyclohexanedicarboxylic diesters, phthalic diesters, and terephthalic diesters.

In a further embodiment the plasticizer component C) comprises exclusively 1,2-cyclohexanedicarboxylic diesters, more particularly the preferred compounds of the formula (III.a) identified above.

In a further embodiment the plasticizer component C) comprises exclusively phthalic diester more particularly the preferred compounds of the formula (III.b) identified above.

In a further embodiment the plasticizer component C) comprises exclusively terephthalic diester more particularly the preferred compounds of the formula (III.c) identified above.

Further Plasticizers

By adapting the proportions of the plasticizer components it is possible to tailor the plasticizer properties to the corresponding end use. This can be accomplished by means of routine experiments.

For use in specific areas of application it may optionally be useful for further plasticizers, different from the plasticizer components B) and C), to be added to the polymer compositions of the invention. For this reason the polymer composition of the invention may optionally comprise at least one further plasticizer D), different from the plasticizer components B) and C).

The additional plasticizer of component D), different from the compounds (I), (II.a) and (II.b), is selected from
  alkyl aralkyl phthalates,
  trialkyl trimellitates,
  alkyl benzoates,
  dibenzoic esters of glycols,
  hydroxybenzoic esters,
  esters of saturated monocarboxylic acids,
  esters of unsaturated monocarboxylic acids,
  esters of hydroxymonocarboxylic acids,
  esters of saturated hydroxydicarboxylic acids,
  alkylsulfonic esters,
  glycerol esters,
  isosorbide esters,
  phosphoric esters,
  citric diesters and citric triesters,
  alkylpyrrolidone derivatives,
  2,5-furandicarboxylic esters,
  2,5-tetrahydrofurandicarboxylic esters,
  epoxidized vegetable oils and epoxidized fatty acid monoalkyl esters,
  dialkyl 1,3-cyclohexanedicarboxylates,
  dialkyl 1,4-cyclohexanedicarboxylates,
  polyesters of aliphatic and/or aromatic polycarboxylic acids with at least dihydric alcohols,
  further plasticizers.

A suitable alkyl aralkyl phthalate is for example benzyl butyl phthalate.

Suitable trialkyl trimellitates have preferably, independently of one another, in each case 4 to 13 C atoms, especially 7 to 11 C atoms in the alkyl groups.

Suitable alkyl benzoates preferably have, independently of one another, in each case 7 to 13 C atoms, especially 9 to 13 C atoms, in the alkyl groups.

Suitable alkyl benzoates are, for example, isononyl benzoate, isodecyl benzoate, or 2-propylheptyl benzoate.

Suitable dibenzoic esters of glycols are diethylene glycol dibenzoate and dibutylene glycol dibenzoate.

Suitable esters of saturated monocarboxylic acids are, for example, esters of acetic acid, butyric acid, and valeric acid.

Suitable esters of saturated hydroxymonocarboxylic acids are, for example, esters of lactic acid.

Suitable esters of dicarboxylic acids are, for example, esters of azelaic acid and sebacic acid.

Suitable esters of hydroxydicarboxylic acids are, for example, esters of tartronic acid.

Suitable alkylsulfonic esters preferably have an alkyl moiety having 8 to 22 C atoms. They include, for example, the phenyl or cresyl ester of pentadecylsulfonic acid.

Suitable isosorbide esters are isosorbide diesters esterified preferably with $C_8$-$C_{13}$-carboxylic acids.

Suitable phosphoric esters are tri-2-ethylhexyl phosphate, trioctyl phosphate, triphenyl phosphate, isodecyl diphenyl phosphate, bis(2-ethylhexyl) phenyl phosphate, and 2-ethylhexyl diphenyl phosphate.

In suitable citric diesters and citric triesters, the OH group may be in free or carboxylated or acetylated form. The OH group is preferably acylated. The alkyl moieties of the acetylated citric triesters preferably have, independently of one another, 4 to 8 C atoms, especially 4 to 6 C atoms.

Suitable are alkylpyrrolidone derivatives with alkyl moieties of 4 to 18 C atoms.

Suitable dialkyl 2,5-furandicarboxylates have, independently of one another, in each case 7 to 13 C atoms, preferably 8 to 12 C atoms, in the alkyl chains.

Suitable dialkyl 2,5-tetrahydrofurandicarboxylates have, independently of one another, in each case 7 to 13 C atoms, preferably 8 to 12 C atoms, in the alkyl chains.

A suitable epoxidized vegetable oil is, for example, epoxidized soybean oil, available for example from Galata-Chemicals, Lampertheim, Germany.

Suitable epoxidized fatty acid monoalkyl esters are available, for example, under the trade name reFlex™ from PolyOne, USA.

Suitable dialkyl 1,3-cyclohexanedicarboxylates and dialkyl 1,4-cyclohexanedicarboxylates preferably have, independently of one another, alkyl groups having 4 to 12 C atoms.

The polyesters of aliphatic and aromatic polycarboxylic acids are preferably polyesters of adipic acid with polyhydric alcohols, more particularly dialkylene glycol polyadipates having 2 to 6 carbon atoms in the alkylene moiety.

In all of the cases stated above, the alkyl groups in each case may be linear or branched and each case may be identical to or different from one another. Reference is made to the general remarks made at the outset concerning suitable and preferred alkyl groups.

Where the polymer composition includes a plasticizer component D), the plasticizer component D) in the polymer composition of the invention amounts preferably to 0 to 50% by weight, preferably 0 to 40% by weight, more preferably 0 to 30% by weight, and more particularly 0 to 25% by weight, based on the total amount of the components B, D), and optionally C) in the polymer composition.

If there is a further plasticizer D), then it is preferably in a concentration of at least 0.01% by weight, more preferably at least 0.1% by weight, more particularly at least 1% by weight, based on the total amount of the components B, D), and optionally C) in the polymer composition.

In one preferred embodiment the polymer composition of the invention contains no further plasticizer different from the plasticizer components B) and C).

Proportions

In accordance with the invention the polymer composition comprises the plasticizer component B1). The polymer composition optionally further comprises the plasticizer components B2), B3), C), and D).

Preferably the polymer composition comprises
0.5 to 99% by weight of component B1),
1 to 90% by weight of component B2) and B3),
0 to 90% by weight of component C),
0 to 50% by weight of component D),
based on the total amount of components B1) and optionally B2), B3), C), and D).

More preferably the polymer composition comprises
0.5 to 99% by weight of component B1),
1 to 90% by weight of component B2) and B3),
1 to 90% by weight of component C),
0 to 50% by weight of component D),
based on the total amount of components B1) and optionally B2), B3), C), and D), Even more preferably the polymer composition comprises
2 to 80% by weight of component B1),
2.5 to 80% by weight of component B2) and B3),
10 to 80% by weight of component C),
0 to 40% by weight of component D),
based on the total amount of components B) and optionally B2), B3), C), and D).

In the polymer composition the total amount of components B1) and optionally B2), B3), C), and D) is generally 0.5 to 300 phr (parts per hundred resin=parts by weight per hundred parts by weight of polymer), preferably 0.5 to 130 phr, more preferably 1 to 100 phr.

Polymer Component A)

In a first embodiment of the polymer composition, component A) comprises one or more polymer(s) selected from PVC homo- and copolymers, with the proviso that the polymer composition comprises 50 to 100% by weight, based on the total amount of polymers in the polymer composition, of at least one polymer selected from PVC homo- and copolymers.

Polyvinyl chloride (PVC) homopolymers are obtained by homopolymerization of vinyl chloride. The PVC used in the invention may be produced, for example, by suspension polymerization, microsuspension polymerization, emulsion polymerization, or bulk polymerization. The preparation of PVC homopolymers by polymerization of vinyl chloride, and the production and composition of plasticized PVC, are described in, for example, "Becker/Braun, Kunststoff-Handbuch [Plastics Handbook], volume 2/1: polyvinyl chloride", 2nd edition, Carl Hanser Verlag, Munich.

Polyvinyl chloride (PVC) copolymers are synthesized from vinyl chloride and further comonomers different from vinyl chloride. The fraction of vinyl chloride is generally at least 20% by weight, preferably at least 50% by weight, and more preferably at least 80% by weight, based on the total weight of the monomers. In principle the PVC copolymers may be produced similar to the PVC homopolymers.

Examples of suitable comonomers are monomers having a C—C double bond, such as, for example ethylene or propylene, 1,3-butadiene, 2-chloro-1,3-butadiene, vinyl alcohol and its $C_2$-$C_{10}$-alkyl esters, vinyl chloride, vinylidene chloride, vinylidene fluoride, tetrafluoroethylene, glycidyl acrylate, glycidyl methacrylate, acrylates and methacrylates with alcohol components from branched and unbranched $C_1$-$C_{10}$-alcohols, vinylaromatics such as, for example, styrene, acrylonitrile, methacrylonitrile, α,β-ethylenically unsaturated monodicarboxylic and dicarboxylic acids, and maleic anhydride.

A customary further monomer, for example, is vinyl acetate. A customary PVC copolymer is, for example, polyvinyl chloride acetate (PVCA), a copolymer of vinyl chloride and vinyl acetate.

Customary production methods for PVC homo- and copolymers, and also possible comonomers for PVC copolymers, are also known to the skilled person.

In a first variant, the plasticizer component A) comprises exclusively polymer component(s) selected from PVC homo- and copolymers.

In another variant, the plasticizer component A) may comprise one or more further polymer component(s), selected from thermoplastic polymers and elastomers and also mixtures thereof. Preferred thermoplastic polymers and elastomers are those specified herein.

The fraction of the polymer component(s) selected from PVC homo- and copolymers is preferably more than 20% by weight, more preferably more than 50% by weight, more particularly more than 80% by weight, based on the total amount of the plasticizer component A).

In a second embodiment of the polymer composition, the plasticizer component A) comprises one or more polymer component(s) selected from thermoplastic polymers and elastomers and also mixtures thereof.

The thermoplastic polymers are preferably selected from
homo- or copolymers which comprise in copolymerized form at least one monomer selected from monomers having a C—C double bond,
homo- and copolymers of vinyl acetals,
polyvinyl esters,
polycarbonates (PC),
polyesters,
polyethers,
polyetherketones,
thermoplastic polyurethanes (TPU),
polysulfides,
polysulfones,
polyethersulfones,
cellulose alkyl esters,
and also copolymers and mixtures thereof, Suitable monomers having a C—C double bond are, for example, ethylene, propylene, 1,3-butadiene, 2-chloro-1, 3-butadiene, vinyl alcohol and its $C_2$-$C_{10}$-alkyl esters, vinyl chloride, vinylidene chloride, vinylidene fluoride, tetrafluoroethylene, glycidyl acrylate, glycidyl methacrylate, acrylates and methacrylates with alcohol components from branched and unbranched $C_1$-$C_{10}$-alcohols, vinylaromatics such as, for example, styrene, acrylonitrile, methacrylonitrile, α,β-ethylenically unsaturated monocarboxylic and dicarboxylic acids, and maleic anhydride.

Homo- or copolymers which comprise in copolymerized form at least one monomer selected from monomers having a C—C double bond are, for example, polyethylene (PE), polypropylene (PP), polybutadiene, polyvinyl alcohol (PVAL), polyvinyl acetate (PVA), polyvinyl chloride (PVC) homo- and copolymers, polyacrylates having identical or different alcohol moieties from the group of the $C_4$-$C_8$-alcohols, polystyrene (PS), polyacrylonitrile, and copolymers thereof, and also
polymethyl methacrylate (PMMA), methyl methacrylate-butylacrylate copolymers, acrylonitrile-butadiene-styrene copolymers (ABS), ethylene-propylene copolymers, ethylene-propylene-diene copolymers (EPDM), styrene-acrylonitrile copolymers (SAN), acrylonitrile-styrene-acrylate (ASA), styrene-butadiene-methyl methacrylate copolymers (SBMMA), styrene-maleic anhydride copolymers, styrene-methacrylic acid copolymers (SMA).

Homo- and copolymers of vinyl acetals are, for example, polyvinyl formal (PVFO), polyvinylacetaldehyde, and polyvinyl butyral (PVB).

Polycarbonates (PC) are, for example, polymers of carbonic acid and aliphatic or aromatic dihydroxy compounds.

Polyesters are, for example, polyalkylene terephthalates, polyhydroxyalkanoates (PHA), polybutylenesuccinates (PBS), polybutylenesuccinate adipates (PBSA), polycaprolactone (PCL), polyhydroxybutyric acid (PHB), polyhydroxyvaleric acid (PHV), and polylactic acid (PLA).

Polyethers are, for example, polyoxymethylene (POM), polyphenylene ethers, polyethylene glycol, and polypropylene glycol.

Polyetherketones are, for example, polyaryletherketones.

Cellulose alkyl esters are, for example, ethylcellulose (EC), cellulose acetate (CA), cellulose propionate (CP) or cellulose acetate/butyrate (CAB).

Preferably the elastomers are selected from natural rubber (NR) or synthetically produced rubber or mixtures thereof.

Preferred synthetically produced rubbers are, for example,
polyisoprene rubber (IR),
styrene-butadiene rubber (SBR),
butadiene rubber (BR),
nitrile-butadiene rubber (NBR),
chloroprene rubber (CR).

Further preferred are rubbers or rubber mixtures which can be vulcanized using sulfur.

Molding Compositions

A further subject of the invention are molding compositions consisting of or comprising a polymer composition as defined herein.

The molding compositions may further comprise at least one further polymer. The further polymer may be a thermoplastic polymer or an elastomer or a mixture thereof.

In one preferred embodiment the polymer present in the molding composition is a thermoplastic polymer.

The total amount of plasticizer of components B) and, if present, C) and D) in the molding composition is usually 0.5 to 300 phr (parts per hundred resin=parts by weight per hundred parts by weight of polymer), preferably 0.5 to 130 phr, more preferably 1 to 100 phr.

In one preferred embodiment the molding compositions consist essentially of PVC homo- and copolymers. They are customarily also referred to as PVC molding compositions.

Essentially in the context of the present invention means that at least 20 wt %, based on the total amount of polymer in the composition, consists of PVC homo- and copolymers. Essentially means preferably at least 50% by weight, more preferably at least 80% by weight, more preferably at least 90% by weight, more preferably at least 95% by weight, and more preferably at least 98% by weight, based on the total amount of polymer in the composition.

With further preference, essentially means that the amount of PVC homo- and copolymers in the composition is in the range from 20 to 95% by weight, preferably at 30 to 90% by weight, and more preferably at 40 to 85% by weight, based on the total amount of the composition.

One special form are molding compositions which comprise PVC homo- and copolymers as their sole polymer component.

The K value, which characterizes the molar mass of the PVC and is determined according to DIN EN ISO 1628-2 (November 1999), is usually between 57 and 90 for the inventively plasticized PVC, preferably between 61 and 85, more particularly between 64 and 80.

Where the molding composition comprises PVC homo- and copolymers, the total amount of the components B) and, if present, C) and D) in the molding composition is from 1 to 300 phr, preferably from 5 to 150 phr, more preferably from 10 to 130 phr, and more particularly 15 to 120 phr.

In another preferred embodiment, the polymer in the molding composition is an elastomer. Preferred elastomers are those identified herein.

Where the molding composition comprises elastomers different from PVC homo- and copolymers, the amount of elastomer in the molding compositions of the invention is from 20 to 95% by weight, preferably from 45 to 90% by weight, and more particularly from 50 to 85% by weight, based on the total weight of the composition.

In the context of the invention, the molding compositions which comprise at least one elastomer may comprise other suitable additives in addition to the constituents above. Present for example may be reinforcing fillers, such as carbon black or silicon dioxide, other fillers, a methylene donor, such as hexamethylenetetramine (HMT), a methylene acceptor, such as phenolic resins modified with cardanol (from cashew nuts), a vulcanizing or crosslinking agent, a vulcanizing or crosslinking accelerator, activators, various types of oil, aging inhibitors, and other different additives which are incorporated for example into tire compositions and other rubber compositions.

Where the molding composition includes rubbers, the total amount of components B), optionally C), and optionally D) in the molding composition is from 1 to 60 phr, preferably 1 to 40 phr, more preferably 2 to 30 phr.

Molding Composition Additives

For the purposes of the invention, the molding compositions can comprise other suitable additives. By way of example, the materials can comprise stabilizers, lubricants, fillers, pigments, flame retardants, light stabilizers, blowing agents, polymeric processing aids, impact modifiers, optical brighteners, antistatic agents, or biostabilizers.

Some suitable additives are described in more detail below. However, the examples listed do not represent any restriction of the molding compositions of the invention, but instead serve merely for illustration. All data relating to content are in % by weight, based on the entire molding composition.

Stabilizers that can be used are any of the conventional PVC stabilizers in solid and liquid form, for example conventional Ca/Zn, Ba/Zn, Pb, or Sn stabilizers, and also acid-binding phyllosilicates, such as hydrotalcite.

The molding compositions of the invention can have from 0.05 to 7% content of stabilizers, preferably from 0.1 to 5%, particularly preferably from 0.2 to 4%, and in particular from 0.5 to 3%.

Lubricants reduce adhesion between the plastics to be processed and metal surfaces, and serve to counteract frictional forces during mixing, plastification, and deformation.

The molding compositions of the invention can comprise, as lubricants, any of the lubricants conventionally used for the processing of plastics. Examples of those that can be used are hydrocarbons, such as oils, paraffins, and PE waxes, fatty alcohols having from 6 to 20 carbon atoms, ketones, carboxylic acids, such as fatty acids and montanic acid, oxidized PE wax, metal salts of carboxylic acids, carboxamides, and also carboxylic esters, for example with the following alcohols: ethanol, fatty alcohols, glycerol, ethanediol, and pentaerythritol, and with long-chain carboxylic acids as acid component.

The molding compositions of the invention can have from 0.01 to 10% lubricant content, preferably from 0.05 to 5%, particularly preferably from 0.1 to 3%, and in particular from 0.2 to 2%.

Fillers have an advantageous effect primarily on the compressive strength, tensile strength, and flexural strength, and also the hardness and heat distortion resistance, of plasticized PVC.

For the purposes of the invention, the molding compositions can also comprise fillers such as carbon black and other inorganic fillers such as natural calcium carbonates, for example chalk, limestone and marble, synthetic calcium carbonates, dolomite, silicates, silica, sand, diatomaceous earth, aluminum silicates, such as kaolin, mica, and feldspar. It is preferable to use the following as fillers: calcium carbonates, chalk, dolomite, kaolin, silicates, talc powder, or carbon black.

The molding compositions of the invention can have from 0.01 to 80% content of fillers, preferably from 0.1 to 60%, particularly preferably from 0.5 to 50%, and in particular from 1 to 40%.

The molding compositions of the invention can also comprise pigments in order to adapt the resultant product to various possible uses.

For the purposes of the present invention, it is possible to use not only inorganic pigments but also organic pigments. Examples of inorganic pigments that can be used are cobalt pigments, such as $CoO/Al_2O_3$, and chromium pigments, such as $Cr_2O_3$. Examples of organic pigments that can be used are monoazo pigments, condensed azo pigments, azomethine pigments, anthraquinone pigments, quinacridones, phthalocyanine pigments, dioxazine pigments, and diketopyrrolopyrrole pigments.

The molding compositions of the invention can have from 0.01 to 10% content of pigments, preferably from 0.05 to 5%, particularly preferably from 0.1 to 3%, and in particular from 0.5 to 2%.

In order to reduce flammability and to reduce smoke generation during combustion, the molding compositions of the invention can also comprise flame retardants.

Examples of flame retardants that can be used are antimony trioxide, phosphate esters, chloroparaffin, aluminum hydroxide, and boron compounds.

The molding compositions of the invention can have from 0.01 to 10% content of flame retardants, preferably from 0.1 to 8%, particularly preferably from 0.2 to 5%, and in particular from 0.5 to 2%.

The molding compositions can also comprise light stabilizers, e.g. UV absorbers, in order to protect items produced from the molding compositions of the invention from surface damage due to the effect of light.

For the purposes of the present invention, examples of light stabilizers that can be used are hydroxybenzophenones, hydroxyphenylbenzotriazoles, cyanoacrylates, and what are known as hindered amine light stabilizers (HALS), such as the derivatives of 2,2,6,6-tetramethylpiperidine.

The molding compositions of the invention can have from 0.01 to 7% content of light stabilizers, e.g. UV absorbers, preferably from 0.1 to 5%, particularly preferably from 0.2 to 4%, and in particular from 0.5 to 3%.

Plastisols

A further subject of the invention concerns plastisols consisting of or comprising a polymer composition as defined herein.

Plastisols for the purposes of this invention comprise a suspension of finely pulverulent polymers in the polymer composition of the invention. Suitable polymers are the aforementioned polymers, more particularly thermoplastic polymers. With regard to suitable and preferred polymers, reference is made here in full to those specified under molding compositions.

The plastisols are conventionally present in liquid form. Under certain conditions the plastisols gel irreversibly.

In one preferred embodiment, the plastisols consist essentially of PVC homo- and copolymers. These are customarily also referred to as PVC plastisols.

"Essentially" for the purposes of the present invention means that at least 20% by weight, based on the total amount of polymer in the composition, consists of PVC homo- and copolymers. Essentially preferably means at least 50% by weight, more preferably at least 80% by weight, more preferably at least 90% by weight, more preferably at least 95% by weight, and more preferably at least 98% by weight, based on the total amount of polymer in the composition.

One specific form are plastisols which comprise PVC as sole polymer component.

The total amount of the components B), optionally C), and optionally D) in the plastisols is customarily from 5 to 300 phr, preferably from 30 to 200 phr.

Plastisols are usually converted to the form of the finished product at ambient temperature via various processes, such as spreading process, screen printing process, casting processes, for example the slush molding process or rotor molding process, dip-coating process, spray process, and the like. Gelling then takes place via heating, whereupon cooling gives a homogeneous product with relatively high or relatively low flexibility.

Uses and Applications

The polymer compositions, molding compositions, and plastisols of the invention are used preferably for producing moldings and foils.

The polymer compositions, molding compositions, and plastisols of the invention are used, for example, for housings of electrical devices, for example of kitchen appliances, and computer housings, tooling, equipment, piping, cables, hoses, for example plastics hoses, water hoses and irrigation hoses, industrial elastomer hoses, or chemicals hoses, wire sheathing, window profiles, vehicle-construction components, for example bodywork constituents, interior automotive trim, vibration dampers for engines, tires, furniture, for example chairs, tables or shelving, foam for cushions and mattresses, tarpaulins, such as truck tarpaulins or tent tarpaulins, gaskets, composite foils, such as foils for laminated safety glass, in particular for vehicle windows and window panes, artificial leather, packaging containers, foamed or unfoamed wallcoverings, adhesive-tape foils, and coatings.

The polymer compositions, molding compositions, and plastisols of the invention are additionally suitable for producing moldings and foils which come directly into contact with people or with foods.

These are primarily medical products, hygiene products, packaging for food and drink, products for the interior sector, toys and childcare items, sports and leisure products, apparel, fibers for textiles, and the like.

The polymer compositions, molding compositions, and plastisols of the invention are used for example for medical products such as, by way of example, tubes for enteral nutrition or hemodialysis, breathing tubes, drainage tubes, infusion tubes, infusion bags, blood bags, catheters, tracheal tubes, disposable syringes, gloves, and respiratory masks.

The polymer compositions, molding compositions, and plastisols of the invention are used for example for foils such as, by way of example, tarpaulins, such as truck tarpaulins, roof tarpaulins, geomembranes, stadium roofs or tent tarpaulins, seals, self-adhesive foils, laminating foils, shrink-fit foils, floor coverings for the exterior, table covers, adhesive tape foils, coating, pool foils, pond foils, and artificial leather.

The polymer compositions, molding compositions, and plastisols of the invention are used for example for packaging for food or drink, such as, by way of example, freshness-retention foils, food-or-drink hoses, drinking-water hoses, containers for storing or freezing food and drink, lid seals, closure caps, crown corks, or synthetic corks for wine.

The polymer compositions, molding compositions, and plastisols of the invention are used for example for products for the interior sector such as, by way of example, ground-coverings, which can be of homogeneous structure or can be composed of a plurality of layers, consisting of at least one foamed layer, examples being floorcoverings, sports floors, or luxury vinyl tiles (LVTs), synthetic leathers, wallcoverings, or foamed or unfoamed wallcoverings, in buildings, or trim and console covers in vehicles.

The polymer compositions, molding compositions, and plastisols of the invention are used for example for baby and child products, childcare items, and toys such as, for example, dolls, inflatable toys, balls, toy figures, modeling clays, non-slip socks, swimming aids, stroller covers, baby-changing mats, bedwarmers, teething rings, and bottles.

The polymer compositions, molding compositions, and plastisols of the invention are used for example for sports and leisure products such as, by way of example, gymnastics balls and other balls, exercise mats, seat cushions, vibrators, massage balls and massage rollers, footwear and footwear soles, air mattresses, safety glasses, gloves, and drinking bottles.

The polymer compositions, molding compositions, and plastisols of the invention are used for example for apparel, such as, by way of example, latex apparel, protective apparel, rain jackets, and rubber boots.

In addition the polymer compositions, molding compositions, and plastisols of the invention are suitable for producing seamless hollow bodies, gloves, and for application in the textile sector and for textile coatings.

Additionally the polymer compositions, molding compositions, and plastisols of the invention, especially PVC plastisols, are suitable for the production of synthetic leather, underbody protection for motor vehicles, seam seals, carpet-backing coatings, high-weight coatings, conveyor belts, dip coatings, and items produced by means of dip processes, and toys, anatomical models for educational uses, floorcoverings, wallcoverings, coated textiles, tarpaulins, tents, strip coatings, roofing membranes, sealing compositions for closures, respiratory masks, and gloves.

The synthetic leather is, for example synthetic leather for automotive construction or handbags.

The toys are, for example, dolls, balls or toy animals.

The textiles are, for example, latex apparel, protective apparel, or rainwear such as rain jackets.

A further subject of the invention is the use of a polymer composition as herein as auxiliary and/or in auxiliaries selected from: calendering auxiliaries, rheology auxiliaries, surfactant compositions, lubricants, quenchers for chemical reactions, phlegmatizing agents, pharmaceutical products, plasticizers in adhesives or sealants, impact modifiers, and antiflow additives.

The surfactant compositions are, for example, flow control aids, film-forming aids, defoamers, antifoams, wetting agents, coalescence agents, and emulsifiers.

The lubricants are, for example, lubricating oils, lubricating greases, and lubricating pastes.

Preparation of the Compounds of the Formulae (I), (II.a) and (II.b)

The compounds of the general formulae (I), (II.a) and (II.b) are customarily prepared by esterification or by transesterification.

Esterification

Conventional processes known to the person skilled in the art can be used to produce the compounds of the formulae (I), (II.a) and (III.b) by esterification of corresponding aliphatic dicarboxylic acids with the corresponding aliphatic alcohols. They include the reaction of at least one alcohol component, selected from the alcohols $R^1$—OH and $R^2$—OH, with a dicarboxylic acid of the general formula HO—C(=O)—Z—C(=O)—OH or a suitable derivative thereof. Examples of suitable derivatives are the acyl halides and anhydrides. A preferred acyl halide is the acyl chloride. Esterification catalysts that can be used are the catalysts conventionally used for this purpose, e.g. mineral acids, such as sulfuric acid and phosphoric acid; organic sulfonic acids, such as methanesulfonic acid and p-toluenesulfonic acid; amphoteric catalysts, in particular titaniums, tin(IV) compounds, or zirconium compounds, such as tetraalkoxytitanium compounds, e.g. tetrabutoxytitanium, and tin(IV) oxide. The water produced during the reaction can be removed by conventional measures, e.g. by distillation. WO 02/38531 describes a process for producing esters of polybasic carboxylic acids where a) a mixture consisting essentially of the acid component or of an anhydride thereof and of the alcohol component is heated to boiling point in the presence of an esterification catalyst in a reaction zone, b) the vapors comprising alcohol and water are fractionated to give an alcohol-rich fraction and a water-rich fraction, c) the alcohol-rich fraction is returned to the reaction zone, and the water-rich fraction is discharged from the process. The process described in WO 02/38531 and the catalysts disclosed therein are likewise suitable for the esterification reaction.

An effective amount of the esterification catalyst is used and is usually in the range from 0.05 to 10% by weight, preferably from 0.1 to 5% by weight, based on the entirety of acid component (or anhydride) and alcohol component.

Other suitable processes for preparing the compounds of the formulae (I), (II.a) and (II.b) by esterification are described by way of example in U.S. Pat. Nos. 6,310,235, 5,324,853, DE 2612355 (Derwent Abstract No. DW 77-72638 Y) or DE-A 1945359 (Derwent Abstract No. DW 73-27151 U). The entirety of the documents mentioned is incorporated herein by way of reference.

In general, the esterification of the dicarboxylic acid HO—C(=O)—Z—C(=O)—OH is carried out in the presence of the alcohol components described above, $R^1$—OH and/or $R^2$—OH, by means of an organic acid or mineral acid, in particular concentrated sulfuric acid. The amount used of the alcohol component here is advantageously at least twice the stoichiometric amount, based on the amount of dicarboxylic acid HO—C(=O)—Z—C(=O)—OH or a suitable derivative thereof in the reaction mixture.

The esterification can generally take place at ambient pressure or at reduced or elevated pressure. It is preferable that the esterification is carried out at ambient pressure or reduced pressure.

The esterification can be carried out in the absence of any added solvent or in the presence of an organic solvent.

If the esterification is carried out in the presence of a solvent, it is preferable that this is an organic solvent that is inert under the reaction conditions. Among such are by way of example aliphatic hydrocarbons, halogenated aliphatic hydrocarbons, or aromatic and substituted aromatic hydrocarbons or ethers. It is preferable that the solvent is one selected from pentane, hexane, heptane, ligroin, petroleum ether, cyclohexane, dichloromethane, trichloromethane, tetrachloromethane, benzene, toluene, xylene, chlorobenzene, dichlorobenzenes, dibutyl ether, THF, dioxane, and mixtures thereof.

The esterification is usually carried out in a temperature range from 50 to 250° C. If the esterification catalyst is selected from organic acids or mineral acids, the esterification is usually carried out in a temperature range from 50 to 160° C. If the esterification catalyst is selected from amphoteric catalysts, the esterification is usually carried out in a temperature range from 100 to 250° C.

The esterification can take place in the absence of or in the presence of an inert gas. The expression inert gas generally means a gas which under the prevailing reaction conditions does not enter into any reactions with the starting materials, reagents, or solvents participating in the reaction, or with the resultant products.

Transesterification

Conventional processes known to the person skilled in the art can be used for the production of the compounds of the formulae (I), (II.a) and (II.b) by transesterification of esters, which differ from the esters of the formulae (I), (II.a) and (II.b), with the corresponding aliphatic alcohols. They include the reaction of the di($C_1$-$C_2$)-alkyl esters of the dicarboxylic acids HO—C(=O)—Z—C(=O)—OH with at least one alcohol $R^1$—OH and/or $R^2$—OH, or mixtures thereof, in the presence of a suitable transesterification catalyst.

Transesterification catalysts that can be used are the conventional catalysts usually used for transesterification reactions, and mostly also used in esterification reactions. Among these are by way of example mineral acids, such as sulfuric acid and phosphoric acid; organic sulfonic acids, such as methanesulfonic acid and p-toluenesulfonic acid; and specific metal catalysts from the group of the tin(IV) catalysts, for example dialkyltin dicarboxylates, such as dibutyltin diacetate, trialkyltin alkoxides, monoalkyltin compounds, such as monobutyltin dioxide, tin salts, such as tin acetate, or tin oxides; from the group of the titanium catalysts: monomeric and polymeric titanates and titanium chelates, for example tetraethyl orthotitanate, tetrapropyl orthotitanate, tetrabutyl orthotitanate, triethanolamine titanate; from the group of the zirconium catalysts: zirconates and zirconium chelates, for example tetrapropyl zirconate, tetrabutyl zirconate, triethanolamine zirconate; and also lithium catalysts, such as lithium salts, lithium alkoxides; and aluminum(III) acetylacetonate, chromium(III) acetylacetonate, iron(III) acetylacetonate, cobalt(II) acetylacetonate, nickel(II) acetylacetonate, and zinc(II) acetylacetonate.

The amount of transesterification catalyst used is from 0.05 to 5% by weight, preferably from 0.1 to 1% by weight. The reaction mixture is preferably heated to the boiling point of the reaction mixture, the reaction temperature therefore being from 20° C. to 200° C., depending on the reactants.

The transesterification can take place at ambient pressure or at reduced or elevated pressure. It is preferable that the transesterification is carried out at a pressure of from 0.001 to 200 bar, particularly preferably from 0.01 to 5 bar. The relatively low-boiling-point alcohol eliminated during the transesterification is preferably continuously removed by distillation in order to shift the equilibrium of the transesterification reaction. The distillation column necessary for this purpose generally has direct connection to the transesterification reactor, and it is preferable that said column is a direct attachment thereto. If a plurality of transesterification reactors which are connected in series are used, each of said reactors can have a distillation column, or the vaporized alcohol mixture can preferably be introduced into a distillation column from the final tanks of the transesterification reactor cascade by way of one or more collection lines. The relatively high-boiling-point alcohol reclaimed in said distillation is preferably returned to the transesterification.

If an amphoteric catalyst is used, this is generally removed via hydrolysis and subsequent removal of the resultant metal oxide, e.g. via filtration. It is preferable that, after reaction has been completed, the catalyst is hydrolyzed by means of washing with water, and the precipitated metal oxide is removed by filtration. The filtrate can, if desired, be subjected to further work-up for the isolation and/or purification of the product. It is preferable that the product is isolated by distillation.

The transesterification of the di($C_1$-$C_2$)-alkyl esters of the dicarboxylic acids HO—C(=O)—Z—C(=O)—OH with at least one alcohol $R^1$—OH and/or $R^2$—OH, or mixtures thereof, preferably takes place in the presence of at least one titanium(IV) alcoholate. Preferred titanium(IV) alcoholates are tetrapropoxytitanium, tetrabutoxytitanium, and mixtures thereof. It is preferable that the amount used of the alcohol component is at least twice the stoichiometric amount, based on the di($C_1$-$C_2$-alkyl) esters used.

The transesterification can be carried out in the absence of, or in the presence of, an added organic solvent. It is preferable that the transesterification is carried out in the presence of an inert organic solvent. Suitable organic solvents are those mentioned above for the esterification. Among these are specifically toluene and THF.

The transesterification is preferably carried out in the temperature range from 50 to 200° C.

The transesterification can take place in the absence of or in the presence of an inert gas. The expression inert gas generally means a gas which under the prevailing reaction conditions does not enter into any reactions with the starting materials, reagents, or solvents participating in the reaction, or with the resultant products. It is preferable that the transesterification takes place without addition of any inert gas.

The aliphatic dicarboxylic acids and alcohols used in producing the compounds of the formulae (I), (II.a) and (II.b) may either be acquired commercially or produced by synthesis pathways that are known from the literature.

Michael Tuttle Musser in "Cyclohexanol and cyclohexanone" in "Ullmann's Encyclopedia of Industrial Chemistry" (2011) (DOI: 10.1002/14356007.a08_217.pub2) discloses technical synthesis pathways for the industrial recovery of cyclohexanol. Cyclohexanol can be recovered in principle via the pathway of the hydrogenation of phenol in the gas phase, or by catalyzed oxidation of cyclohexane with the aid of transition metal catalysts in the liquid phase by means of atmospheric oxygen. Cyclohexanol can be obtained more selectively and in higher yields by using boric acid in the liquid phase and carrying out oxidation with, again, atmospheric oxygen. This latter process proceeds via the intermediate of a peroxoboric ester of the cyclohexanol. Likewise performed on the industrial scale is a process starting from benzene. In that process, benzene is hydrogenated gradually, and cyclohexene is isolated from the secondary components, such as unreacted benzene and cyclohexane. Then, in a catalyzed step, cyclohexene is reacted very selectively and in high yields (up to 95% over all the steps) to give cyclohexanol.

Michael Tuttle Musser, in "Adipic acid" in "Ullmann's Encyclopedia of Industrial Chemistry" (2000) (DOI: 10.1002/14356007.a01_269), discloses technical synthesis pathways for the industrial recovery of adipic acid. Nowadays virtually the entire worldwide demand for adipic acid is covered via the pathway of the oxidation of either cyclohexanol or cyclohexanone, or a mixture thereof, by means of nitric acid.

Alkanols

In the context of the present patent application, with regard to the alkanols identified hereinafter, the term "isoalcohol" refers, unless otherwise indicated, to a mixture of structural isomers.

Heptanol

The heptanols used for the production of the ester compounds can be straight-chain or branched or can be composed of mixtures of straight-chain and branched heptanols. It is preferable to use mixtures of branched heptanols, also known as isoheptanol, which are produced via rhodium- or preferably cobalt-catalyzed hydroformylation of propene dimer, obtainable by way of example by the Dimersol® process, and subsequent hydrogenation of the resultant isoheptanals to give an isoheptanol mixture. Because of the process used for its production, the resultant isoheptanol mixture is composed of a plurality of isomers. Substantially straight-chain heptanols can be obtained via rhodium- or preferably cobalt-catalyzed hydroformylation of 1-hexene and subsequent hydrogenation of the resultant n-heptanal to give n-heptanol. The hydroformylation of 1-hexene or of propene dimer can be achieved by methods known per se: compounds used as catalyst in hydroformylation with rhodium catalysts homogeneously dissolved in the reaction medium can be not only uncomplexed rhodium carbonyls which are formed in situ under the conditions of the hydroformylation reaction within the hydroformylation reaction mixture on exposure to synthesis gas, e.g. from rhodium salts, but also complex rhodium carbonyl compounds, in particular complexes with organic phosphines, such as triphenylphosphine, or with organophosphites, preferably chelating biphosphites, as described by way of example in U.S. Pat. No. 5,288,918. Compounds used in the cobalt-catalyzed hydroformylation of these olefins are generally cobalt carbonyl compounds which are homogeneously soluble in the reaction mixture and which are formed in situ from cobalt salts under the conditions of the hydroformylation reaction on exposure to synthesis gas. If the cobalt-catalyzed hydroformylation is carried out in the presence of trialkyl- or triarylphosphines, the desired heptanols are formed directly as hydroformylation product, and there is therefore then no need for further hydrogenation of the aldehyde function.

Examples of suitable processes for the cobalt-catalyzed hydroformylation of 1-hexene or of the hexene isomer mixtures are the established industrial processes explained on pages 162-168 of Falbe, New Syntheses with Carbon Monoxide, Springer, Berlin, 1980, an example being the Ruhrchemie process, the BASF process, the Kuhlmann process, or the Shell process. Whereas the Ruhrchemie, BASF, and Kuhlmann process operate with non-ligand-modified cobalt carbonyl compounds as catalysts and thus give hexanal mixtures, the Shell process (DE-A 1593368) uses, as catalyst, phosphine- or phosphite-ligand-modified cobalt carbonyl compounds which lead directly to the hexanol mixtures because they also have high hydrogenation activity. DE-A 2139630, DE-A 2244373, DE-A 2404855, and WO 01014297 provide detailed descriptions of advantageous embodiments for the conduct of the hydroformylation with non-ligand-modified cobalt carbonyl complexes.

The rhodium-catalyzed hydroformylation of 1-hexene or of the hexene isomer mixtures can use the established industrial low-pressure rhodium hydroformylation process with triphenylphosphine-ligand-modified rhodium carbonyl compounds, which is subject matter of U.S. Pat. No. 4,148,830. Non-ligand-modified rhodium carbonyl compounds can serve advantageously as catalyst for the rhodium-catalyzed hydroformylation of long-chain olefins, for example of the hexene isomer mixtures obtained by the processes described above; this differs from the low-pressure process in requiring a higher pressure of from 80 to 400 bar. The conduct of high-pressure rhodium hydroformylation processes of this type is described by way of example in EP-A 695734, EP-B 880494, and EP-B 1047655.

The isoheptanal mixtures obtained after hydroformylation of the hexene isomer mixtures are catalytically hydrogenated in a manner that is per se conventional to give isoheptanol mixtures. For this purpose it is preferable to use heterogeneous catalysts which comprise, as catalytically active component, metals and/or metal oxides of groups VI to VIII, or else of transition group I, of the Periodic Table of the Elements, in particular chromium, molybdenum, manganese, rhenium, iron, cobalt, nickel, and/or copper, optionally deposited on a support material, such as $Al_2O_3$, $SiO_2$ and/or $TiO_2$. Catalysts of this type are described by way of example in DE-A 3228881, DE-A 2628987, and DE-A 2445303. It is particularly advantageous to carry out the hydrogenation of the isoheptanals with an excess of hydrogen of from 1.5 to 20% above the stoichiometric amount of hydrogen needed for the hydrogenation of the isoheptanals, at temperatures of from 50 to 200° C., and at a hydrogen pressure of from 25 to 350 bar, and for avoidance of side-reactions to add, during the course of the hydrogenation, in accordance with DE-A 2628987, a small amount of water, advantageously in the form of an aqueous solution of an alkali metal hydroxide or alkali metal carbonate, in accordance with the teaching of WO 01087809.

Octanol

For many years, 2-ethylhexanol was the largest-production-quantity plasticizer alcohol, and it can be obtained through the aldol condensation of n-butyraldehyde to give 2-ethylhexenal and subsequent hydrogenation thereof to give 2-ethylhexanol (see Ullmann's Encyclopedia of Industrial Chemistry; 5th edition, vol. A 10, pp. 137-140, VCH Verlagsgesellschaft GmbH, Weinheim 1987).

Substantially straight-chain octanols can be obtained via rhodium- or preferably cobalt-catalyzed hydroformylation of 1-heptene and subsequent hydrogenation of the resultant n-octanal to give n-octanol. The 1-heptene needed for this purpose can be obtained from the Fischer-Tropsch synthesis of hydrocarbons.

By virtue of the production route used for the alcohol isooctanol, it is not a unitary chemical compound, in contrast to 2-ethylhexanol or n-octanol, but instead is an isomer mixture of variously branched $C_8$-alcohols, for example of 2,3-dimethyl-1-hexanol, 3,5-dimethyl-1-hexanol, 4,5-dimethyl-1-hexanol, 3-methyl-1-heptanol, and 5-methyl-1-heptanol; these can be present in the isooctanol in various quantitative proportions which depend on the production conditions and production processes used. Isooctanol is usually produced via codimerization of propene with butenes, preferably n-butenes, and subsequent hydroformylation of the resultant mixture of heptene isomers. The octanal isomer mixture obtained in the hydroformylation can subsequently be hydrogenated to give the isooctanol in a manner that is conventional per se.

The codimerization of propene with butenes to give isomeric heptenes can advantageously be achieved with the aid of the homogeneously catalyzed Dimersol® process (Chauvin et al; Chem. Ind.; May 1974, pp. 375-378), which uses, as catalyst, a soluble nickel phosphine complex in the presence of an ethylaluminum chlorine compound, for example ethylaluminum dichloride. Examples of phosphine ligands that can be used for the nickel complex catalyst are tributylphosphine, triisopropyl-phosphine, tricyclohexyl-phosphine, and/or tribenzylphosphine. The reaction takes place at temperatures of from 0 to 80° C., and it is advantageous here to set a pressure at which the olefins are present in solution in the liquid reaction mixture (Cornils; Hermann: Applied Homogeneous Catalysis with Organometallic Compounds; 2nd edition, vol. 1; pp. 254-259, Wiley-VCH, Weinheim 2002).

In an alternative to the Dimersol® process operated with nickel catalysts homogeneously dissolved in the reaction medium, the codimerization of propene with butenes can also be carried out with a heterogeneous NiO catalyst deposited on a support; heptene isomer distributions obtained here are similar to those obtained in the homogeneously catalyzed process. Catalysts of this type are by way of example used in what is known as the Octol® process (Hydrocarbon Processing, February 1986, pp. 31-33), and a specific heterogeneous nickel catalyst with good suitability for olefin dimerization or olefin codimerization is disclosed by way of example in WO 9514647.

Codimerization of propene with butenes can also use, instead of nickel-based catalysts, heterogeneous Brønsted-acid catalysts; heptenes obtained here are generally more highly branched than in the nickel-catalyzed processes. Examples of catalysts suitable for this purpose are solid phosphoric acid catalysts, e.g. phosphoric-acid-impregnated kieselguhr or diatomaceous earth, these being as utilized in the PolyGas® process for olefin dimerization or olefin oligomerization (Chitnis et al.; Hydrocarbon Engineering 10, No. 6—June 2005). Brønsted-acid catalysts that have very good suitability for the codimerization of propene and butenes to give heptenes are zeolites, which are used in the EMOGAS® process, a further development based on the PolyGas® process.

The 1-heptene and the heptene isomer mixtures are converted to n-octanal and, respectively, octanal isomer mixtures by the known processes explained above in connection with the production of n-heptanal and heptanal isomer mixtures, by means of rhodium- or cobalt-catalyzed hydroformylation, preferably cobalt-catalyzed hydroformylation. These are then hydrogenated to give the corresponding octanols, for example by means of one of the catalysts mentioned above in connection with production of n-heptanol and of isoheptanol.

Nonanol

Substantially straight-chain nonanol can be obtained via rhodium- or preferably cobalt-catalyzed hydroformylation of 1-octene and subsequent hydrogenation of the resultant n-nonanal. The starting olefin 1-octene can be obtained by way of example by way of ethylene oligomerization by means of a nickel complex catalyst that is homogeneously soluble in the reaction medium—1,4-butanediol—with, for example, diphenyl-phosphinoacetic acid or 2-diphenylphosphinobenzoic acid as ligand. This process is also known as the Shell Higher Olefins Process or SHOP process (see Weisermel, Arpe: Industrielle Organische Chemie [Industrial organic chemistry]; 5th edition, p. 96; Wiley-VCH, Weinheim 1998).

Isononanol used for the synthesis of the diisononyl esters comprised in the composition of the invention is not a unitary chemical compound, but instead is a mixture of variously branched, isomeric $C_9$-alcohols which can have various degrees of branching depending on the manner in which they were produced, and also in particular on the starting materials used. The isononanols are generally produced via dimerization of butenes to give isooctene mixtures, subsequent hydroformylation of the resultant isooctene mixtures, and hydrogenation of the resultant isononanal mixtures to give isononanol mixtures, as explained in Ullmann's Encyclopedia of Industrial Chemistry, 5th edition, vol. A1, pp. 291-292, VCH Verlagsgesellschaft GmbH, Weinheim 1995.

Isobutene, cis- and trans-2-butene, and also 1-butene, or a mixture of these butene isomers, can be used as starting material for the production of the isononanols. The dimerization of pure isobutene, mainly catalyzed by means of liquid acids, e.g. sulfuric acid or phosphoric acid, or by means of solid acids, e.g. phosphoric acid applied to kieselguhr, $SiO_2$, or $Al_2O_3$, as support material, or zeolites or Brønsted acids, mainly gives the highly branched compound 2,4,4-trimethylpentene, also termed diisobutylene, which gives highly branched isononanols after hydroformylation and hydrogenation of the aldehyde.

Preference is given to isononanols with a low degree of branching. Isononanol mixtures of this type with little branching are prepared from the linear butenes 1-butene, cis- and/or trans-2-butene, which optionally can also comprise relatively small amounts of isobutene, by way of the route described above involving butene dimerization, hydroformylation of the isooctene, and hydrogenation of the resultant isononanal mixtures. A preferred raw material is what is known as raffinate II, which is obtained from the $C_4$-cut of a cracker, for example of a steam cracker, after elimination of allenes, acetylenes, and dienes, in particular 1,3-butadiene, via partial hydrogenation thereof to give linear butenes, or removal thereof via extractive distillation, for example by means of N-methylpyrrolidone, and subsequent Brønsted-acid catalyzed removal of the isobutene comprised therein via reaction thereof with methanol or isobutanol by established large-scale-industrial processes with formation of the fuel additive methyl tert-butyl ether (MTBE), or of the isobutyl tert-butyl ether that is used to obtain pure isobutene.

Raffinate II also comprises, alongside 1-butene and cis- and trans-2-butene, n- and isobutane, and residual amounts of up to 5% by weight of isobutene.

The dimerization of the linear butenes or of the butene mixture comprised in raffinate II can be carried out by means of the familiar processes used on a large industrial scale, for example those explained above in connection with the production of isoheptene mixtures, for example by means of heterogeneous, Brønsted-acid catalysts such as those used in the PolyGas® process or EMOGAS® process, by means of the Dimersol® process with use of nickel complex catalysts homogeneously dissolved in the reaction medium, or by means of heterogeneous, nickel(II)-oxide-containing catalysts by the Octol® process or by the process of WO 9514647. The resultant isooctene mixtures are converted to isononanal mixtures by the known processes explained above in connection with the production of heptanal isomer mixtures, by means of rhodium or cobalt-catalyzed hydroformylation, preferably cobalt-catalyzed hydroformylation. These are then hydrogenated to give the suitable isononanol mixtures, for example by means of one of the catalysts mentioned above in connection with the production of isoheptanol.

The resultant isononanol isomer mixtures can be characterized by way of their iso-index, which can be calculated from the degree of branching of the individual, isomeric isononanol components in the isononanol mixture multiplied by the percentage proportion of these in the isononanol mixture: by way of example, n-nonanol contributes the value 0 to the iso-index of an isononanol mixture, methyloctanols (single branching) contribute the value 1, and dimethylheptanols (double branching) contribute the value 2. The higher the linearity, the lower the iso-index of the relevant isononanol mixture. Accordingly, the iso-index of an isononanol mixture can be determined via gas-chromatographic separation of the isononanol mixture into its individual isomers and attendant quantification of the percentage quantitative proportion of these in the isononanol mixture, determined by standard methods of gas-chromatographic analysis. In order to increase the volatility of the isomeric nonanols and improve the gas-chromatographic separation of these, they are advantageously trimethylsilylated by means of standard methods, for example via reaction with N-methyl-N-trimethylsilyltrifluoroacetamide, prior to gas-chromatographic analysis. In order to achieve maximum quality of separation of the individual components during gas-chromatographic analysis, it is preferable to use capillary columns with polydimethylsiloxane as stationary phase. Capillary columns of this type are obtainable commercially, and a little routine experimentation by the person skilled in the art is all that is needed in order to select, from the many different products available commercially, one that has ideal suitability for this separation task.

The diisononyl esters used in the composition of the invention have generally been esterified with isononanols with an iso-index of from 0.8 to 2, preferably from 1.0 to 1.8, and particularly preferably from 1.1 to 1.5, which can be produced by the abovementioned processes.

Possible compositions of isononanol mixtures that can be used for the production of the ester compounds used according to the invention are stated below merely by way of example, and it should be noted here that the proportions of the isomers individually listed within the isononanol mixture can vary, depending on the composition of starting material, for example raffinate II, the composition of butenes in which can vary with the production process, and on variations in the production conditions used, for example the age of the catalysts utilized, and conditions of temperature and of pressure, which have to be adjusted appropriately thereto.

By way of example, an isononanol mixture produced via cobalt-catalyzed hydroformylation and subsequent hydrogenation from an isooctene mixture produced with use of raffinate II as raw material by means of the catalyst and process in accordance with WO 9514647 can have the following composition:

from 1.73 to 3.73% by weight, preferably from 1.93 to 3.53% by weight, particularly preferably from 2.23 to 3.23% by weight of 3-ethyl-6-methylhexanol;
from 0.38 to 1.38% by weight, preferably from 0.48 to 1.28% by weight, particularly preferably from 0.58 to 1.18% by weight of 2,6-dimethylheptanol;
from 2.78 to 4.78% by weight, preferably from 2.98 to 4.58% by weight, particularly preferably from 3.28 to 4.28% by weight of 3,5-dimethylheptanol;
from 6.30 to 16.30% by weight, preferably from 7.30 to 15.30% by weight, particularly preferably from 8.30 to 14.30% by weight of 3,6-dimethylheptanol;
from 5.74 to 11.74% by weight, preferably from 6.24 to 11.24% by weight, particularly preferably from 6.74 to 10.74% by weight of 4,6-dimethylheptanol;
from 1.64 to 3.64% by weight, preferably from 1.84 to 3.44% by weight, particularly preferably from 2.14 to 3.14% by weight of 3,4,5-trimethylhexanol;
from 1.47 to 5.47% by weight, preferably from 1.97 to 4.97% by weight, particularly preferably from 2.47 to 4.47% by weight of 3,4,5-trimethylhexanol, 3-methyl-4-ethylhexanol and 3-ethyl-4-methylhexanol;
from 4.00 to 10.00% by weight, preferably from 4.50 to 9.50% by weight, particularly preferably from 5.00 to 9.00% by weight of 3,4-dimethylheptanol;
from 0.99 to 2.99% by weight, preferably from 1.19 to 2.79% by weight, particularly preferably from 1.49 to 2.49% by weight of 4-ethyl-5-methylhexanol and 3-ethylheptanol;
from 2.45 to 8.45% by weight, preferably from 2.95 to 7.95% by weight, particularly preferably from 3.45 to 7.45% by weight of 4,5-dimethylheptanol and 3-methyloctanol;
from 1.21 to 5.21% by weight, preferably from 1.71 to 4.71% by weight, particularly preferably from 2.21 to 4.21% by weight of 4,5-dimethylheptanol;
from 1.55 to 5.55% by weight, preferably from 2.05 to 5.05% by weight, particularly preferably from 2.55 to 4.55% by weight of 5,6-dimethylheptanol;
from 1.63 to 3.63% by weight, preferably from 1.83 to 3.43% by weight, particularly preferably from 2.13 to 3.13% by weight of 4-methyloctanol;
from 0.98 to 2.98% by weight, preferably from 1.18 to 2.78% by weight, particularly preferably from 1.48 to 2.48% by weight of 5-methyloctanol;
from 0.70 to 2.70% by weight, preferably from 0.90 to 2.50% by weight, particularly preferably from 1.20 to 2.20% by weight of 3,6,6-trimethylhexanol;
from 1.96 to 3.96% by weight, preferably from 2.16 to 3.76% by weight, particularly preferably from 2.46 to 3.46% by weight of 7-methyloctanol;
from 1.24 to 3.24% by weight, preferably from 1.44 to 3.04% by weight, particularly preferably from 1.74 to 2.74% by weight of 6-methyloctanol;
from 0.1 to 3% by weight, preferably from 0.2 to 2% by weight, particularly preferably from 0.3 to 1% by weight of n-nonanol;
from 25 to 35% by weight, preferably from 28 to 33% by weight, particularly preferably from 29 to 32% by weight of other alcohols having 9 and 10 carbon atoms;

with the proviso that the entirety of the components mentioned gives 100% by weight.

In accordance with what has been said above, an isononanol mixture produced via cobalt-catalyzed hydroformylation and subsequent hydrogenation with use of an isooctene mixture produced by means of the PolyGas® process or EMOGAS® process with an ethylene-containing butene mixture as raw material can vary within the range of the compositions below, depending on the composition of the raw material and variations in the reaction conditions used:

from 6.0 to 16.0% by weight, preferably from 7.0 to 15.0% by weight, particularly preferably from 8.0 to 14.0% by weight of n-nonanol;
from 12.8 to 28.8% by weight, preferably from 14.8 to 26.8% by weight, particularly preferably from 15.8 to 25.8% by weight of 6-methyloctanol;
from 12.5 to 28.8% by weight, preferably from 14.5 to 26.5% by weight, particularly preferably from 15.5 to 25.5% by weight of 4-methyloctanol;
from 3.3 to 7.3% by weight, preferably from 3.8 to 6.8% by weight, particularly preferably from 4.3 to 6.3% by weight of 2-methyloctanol;
from 5.7 to 11.7% by weight, preferably from 6.3 to 11.3% by weight, particularly preferably from 6.7 to 10.7% by weight of 3-ethylheptanol;
from 1.9 to 3.9% by weight, preferably from 2.1 to 3.7% by weight, particularly preferably from 2.4 to 3.4% by weight of 2-ethylheptanol;
from 1.7 to 3.7% by weight, preferably from 1.9 to 3.5% by weight, particularly preferably from 2.2 to 3.2% by weight of 2-propylhexanol;
from 3.2 to 9.2% by weight, preferably from 3.7 to 8.7% by weight, particularly preferably from 4.2 to 8.2% by weight of 3,5-dimethylheptanol;
from 6.0 to 16.0% by weight, preferably from 7.0 to 15.0% by weight, particularly preferably from 8.0 to 14.0% by weight of 2,5-dimethylheptanol;
from 1.8 to 3.8% by weight, preferably from 2.0 to 3.6% by weight, particularly preferably from 2.3 to 3.3% by weight of 2,3-dimethylheptanol;
from 0.6 to 2.6% by weight, preferably from 0.8 to 2.4% by weight, particularly preferably from 1.1 to 2.1% by weight of 3-ethyl-4-methylhexanol;
from 2.0 to 4.0% by weight, preferably from 2.2 to 3.8% by weight, particularly preferably from 2.5 to 3.5% by weight of 2-ethyl-4-methylhexanol;
from 0.5 to 6.5% by weight, preferably from 1.5 to 6% by weight, particularly preferably from 1.5 to 5.5% by weight of other alcohols having 9 carbon atoms;

with the proviso that the entirety of the components mentioned gives 100% by weight.

Decanol

Isodecanol which is used for the synthesis of the diisodecyl esters comprised in the composition of the invention is not a unitary chemical compound, but instead is a complex mixture of differently branched isomeric decanols.

These are generally produced via nickel- or Brønsted-acid-catalyzed trimerization of propylene, for example by the PolyGas® process or the EMOGAS® process explained above, subsequent hydroformylation of the resultant isononene isomer mixture by means of homogeneous rhodium or cobalt carbonyl catalysts, preferably by means of cobalt carbonyl catalysts, and hydrogenation of the resultant isodecanal isomer mixture, e.g. by means of the catalysts and processes mentioned above in connection with the production of $C_7$-$C_9$-alcohols (Ullmann's Encyclopedia of Industrial Chemistry; 5th edition, vol. A1, p. 293, VCH Verlagsgesellschaft GmbH, Weinheim 1985). The resultant isodecanol generally has a high degree of branching.

2-Propylheptanol used for the synthesis of the di(2-propylheptyl) esters comprised in the composition of the invention can be pure 2-propylheptanol or can be propylheptanol isomer mixtures of the type generally formed during the industrial production of 2-propylheptanol and likewise generally termed 2-propylheptanol.

Pure 2-propylheptanol can be obtained via aldol condensation of n-valeraldehyde and subsequent hydrogenation of the resultant 2-propylheptenal, for example in accordance with U.S. Pat. No. 2,921,089. By virtue of the production process, commercially obtainable 2-propylheptanol generally comprises, alongside the main component 2-propylheptanol, one or more of the following isomers of 2-propylheptanol: 2-propyl-4-methylhexanol, 2-propyl-5-methylhexanol, 2-isopropylheptanol, 2-isopropyl-4-methylhexanol, 2-isopropyl-5-methylhexanol and/or 2-propyl-4,4-dimethylpentanol. The presence of other isomers of 2-propylheptanol, for example 2-ethyl-2,4-dimethylhexanol, 2-ethyl-2-methylheptanol, and/or 2-ethyl-2,5-dimethylhexanol, in the 2-propylheptanol is possible, but because the rates of formation of the aldehydic precursors of these isomers in the aldol condensation are low, the amounts of these present in the 2-propylheptanol are only trace amounts, if they are present at all, and they play practically no part in determining the plasticizer properties of the compounds produced from these 2-propylheptanol isomer mixtures.

Various hydrocarbon sources can be utilized as starting material for the production of 2-propylheptanol, for example 1-butene, 2-butene, raffinate I—an alkane/alkene mixture which is obtained from the $C_4$-cut of a cracker after removal of allenes, of acetylenes, and of dienes and which also comprises, alongside 1- and 2-butene, considerable amounts of isobutene—or raffinate II, which is obtained from raffinate I via removal of isobutene and then comprises, as olefin components other than 1- and 2-butene, only small proportions of isobutene. It is also possible, of course, to use mixtures of raffinate I and raffinate II as raw material for the production of 2-propylheptanol. These olefins or olefin mixtures can be hydroformylated by methods that are conventional per se with cobalt or rhodium catalysts, and 1-butene here gives a mixture of n- and isovaleraldehyde— the term isovaleraldehyde designating the compound 2-methylbutanal, the n/iso ratio of which can vary within relatively wide limits, depending on catalyst used and on hydroformylation conditions. By way of example, when a triphenylphosphine-modified homogeneous rhodium catalyst (Rh/TPP) is used, n- and isovaleraldehyde are formed in an n/iso ratio that is generally from 10:1 to 20:1 from 1-butene, whereas when rhodium hydroformylation catalysts modified with phosphite ligands are used, for example in accordance with U.S. Pat. No. 5,288,918 or WO 05028407, or when rhodium hydroformylation catalysts modified with phosphoamidite ligands are used, for example in accordance with WO 0283695, n-valeraldehyde is formed almost exclusively. While the Rh/TPP catalyst system converts 2-butene only very slowly in the hydroformylation, and most of the 2-butene can therefore be reclaimed from the hydroformylation mixture, 2-butene is successfully hydroformylated with the phosphite-ligand- or phosphorus amidite ligand-modified rhodium catalysts mentioned, the main product formed being n-valeraldehyde. In contrast, isobutene comprised within the olefinic raw material is hydroformylated at varying rates by practically all catalyst systems to 3-methylbutanal and, in the case of some catalysts, to a lesser extent to pivalaldehyde.

The $C_5$-aldehydes obtained in accordance with starting materials and catalysts used, i.e. n-valeraldehyde optionally mixed with isovaleraldehyde, 3-methylbutanal, and/or pivalaldehyde, can be separated, if desired, completely or to some extent by distillation into the individual components prior to the aldol condensation, and here again there is therefore a possibility of influencing and of controlling the composition of isomers of the $C_{10}$-alcohol component of the ester mixtures used in the process of the invention. Equally, it is possible that the $C_5$-aldehyde mixture formed during the hydroformylation is introduced into the aldol condensation without prior isolation of individual isomers. If n-valeraldehyde is used in the aldol condensation, which can be carried out by means of a basic catalyst, for example an aqueous solution of sodium hydroxide or of potassium hydroxide, for example by the processes described in EP-A 366089, U.S. Pat. No. 4,426,524, or U.S. Pat. No. 5,434,313, 2-propylheptenal is produced as sole condensate, whereas if a mixture of isomeric $C_5$-aldehydes is used the product comprises an isomer mixture of the products of the homoaldol condensation of identical aldehyde molecules and of the crossed aldol condensation of different valeraldehyde isomers. The aldol condensation can, of course, be controlled via targeted reaction of individual isomers in such a way that a single aldol condensation isomer is formed predominantly or entirely. The relevant aldol condensates can then be hydrogenated with conventional hydrogenation catalysts, for example those mentioned above for the hydrogenation of aldehydes, to give the corresponding alcohols or alcohol mixtures, usually after preceding, preferably distillative isolation from the reaction mixture and, if desired, distillative purification.

As mentioned above, the ester compounds comprised in the composition of the invention can have been esterified with pure 2-propylheptanol. However, production of said esters generally uses mixtures of 2-propylheptanol with the propylheptanol isomers mentioned in which the content of 2-propylheptanol is at least 50% by weight, preferably from 60 to 98% by weight, and particularly preferably from 80 to 95% by weight, in particular from 85 to 95% by weight.

Suitable mixtures of 2-propylheptanol with the propylheptanol isomers comprise by way of example those of from 60 to 98% by weight of 2-propylheptanol, from 1 to 15% by weight of 2-propyl-4-methylhexanol, and from 0.01 to 20% by weight of 2-propyl-5-methylhexanol, and from 0.01 to 24% by weight of 2-isopropylheptanol, where the sum of the proportions of the individual constituents does not exceed 100% by weight. It is preferable that the proportions of the individual constituents give a total of 100% by weight.

Other suitable mixtures of 2-propylheptanol with the propylheptanol isomers comprise by way of example those of from 75 to 95% by weight of 2-propylheptanol, from 2 to 15% by weight of 2-propyl-4-methylhexanol, from 1 to 20% by weight of 2-propyl-5-methylhexanol, from 0.1 to 4% by weight of 2-isopropylheptanol, from 0.1 to 2% by weight of 2-isopropyl-4-methylhexanol, and from 0.1 to 2% by weight of 2-isopropyl-5-methylhexanol, where the sum of the proportions of the individual constituents does not exceed 100% by weight. It is preferable that the proportions of the individual constituents give a total of 100% by weight.

Preferred mixtures of 2-propylheptanol with the propylheptanol isomers comprise those with from 85 to 95% by weight of 2-propylheptanol, from 5 to 12% by weight of 2-propyl-4-methylhexanol, and from 0.1 to 2% by weight of 2-propyl-5-methylhexanol, and from 0.01 to 1% by weight of 2-isopropylheptanol, where the sum of the proportions of the individual constituents does not exceed 100% by weight. It is preferable that the proportions of the individual constituents give a total of 100% by weight.

When the 2-propylheptanol isomer mixtures mentioned are used instead of pure 2-propylheptanol for the production of the compounds of the general formula (I) and/or (II), the isomer composition of the alkyl ester groups and, respectively alkyl ether groups corresponds in practical terms to the composition of the propylheptanol isomer mixtures used for the esterification.

Undecanol

The undecanols used for the production of the ester compounds comprised in the composition of the invention can be straight-chain or branched, or can be composed of mixtures of straight-chain and branched undecanols. It is preferable to use, as alcohol component, mixtures of branched undecanols, also termed isoundecanol.

Substantially straight-chain undecanol can be obtained via rhodium- or preferably cobalt-catalyzed hydroformylation of 1-decene and subsequent hydrogenation of the resultant n-undecanal. The starting olefin 1-decene is produced by way of the SHOP process mentioned previously for the production of 1-octene.

For the production of branched isoundecanol, the 1-decene obtained in the SHOP process can be subjected to skeletal isomerization, for example by means of acidic zeolitic molecular sieves, as described in WO 9823566, whereupon mixtures of isomeric decenes are formed, rhodium- or preferably cobalt-catalyzed hydroformylation of which, with subsequent hydrogenation of the resultant isoundecanal mixtures, gives the isoundecanol used for the production of the ester compounds used in the invention. Hydroformylation of 1-decene or of isodecene mixtures by means of rhodium or cobalt catalysis can be achieved as described previously in connection with the synthesis of $C_7$-$C_{10}$-alcohols. Similar considerations apply to the hydrogenation of n-undecanal or of isoundecanal mixtures to give n-undecanol and, respectively, isoundecanol.

After distillative purification of the hydrogenation product, the resultant $C_7$-$C_{11}$-alkyl alcohols or a mixture of these can be used as described above for the production of the ester compounds used in the invention.

Dodecanol

Substantially straight-chain dodecanol can be obtained advantageously by way of the Alfol® process or Epal® process. These processes include the oxidation and hydrolysis of straight-chain trialkylaluminum compounds which are constructed stepwise by way of a plurality of ethylation reactions, starting from triethylaluminum, with use of Ziegler-Natta catalysts. The desired n-dodecanol can be obtained from the resultant mixtures of substantially straight-chain alkyl alcohols of varying chain length after distillative discharge of the $C_{12}$-alkyl alcohol fraction.

Alternatively, n-dodecanol can also be produced via hydrogenation of natural fatty acid methyl esters, for example from coconut oil.

Branched isododecanol can be obtained by analogy with the known processes for the codimerization and/or oligomerization of olefins, as described by way of example in WO 0063151, with subsequent hydroformylation and hydrogenation of the isoundecene mixtures, as described by way of example in DE-A 4339713. After distillative purification of the hydrogenation product, the resultant isododecanols or mixtures of these can be used as described above for the production of the ester compounds used in the invention.

EXAMPLES

Figure 1:
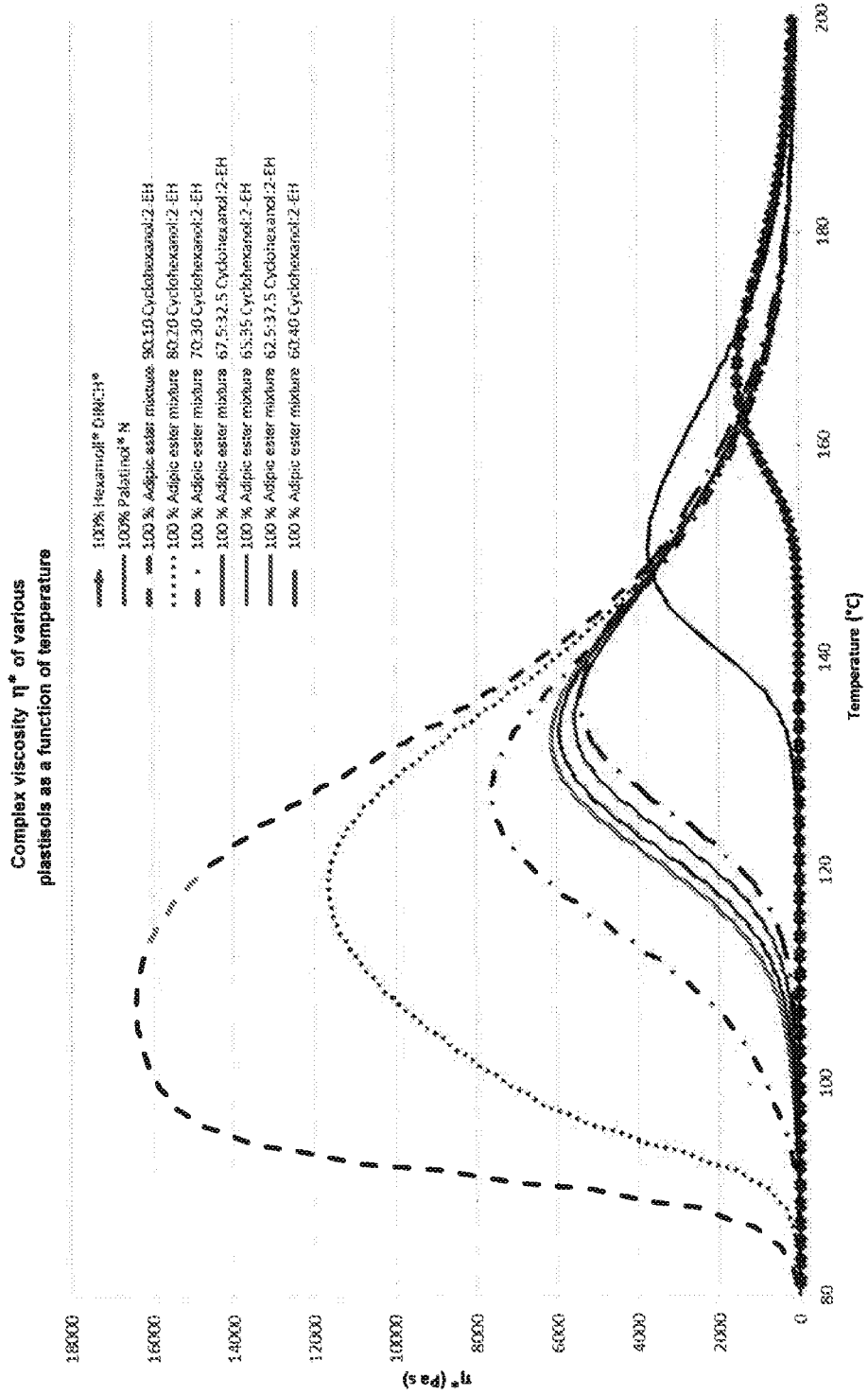
FIG. 1 shows the gelling behavior of PVC plastisols comprising adipic ester mixtures, having 2-ethylhexanol and cyclohexanol as alcohol component, as their plasticizer component, and also that of comparative PVC plastisols comprising Hexamoll® DINCH® or Palatinol® N.

Abbreviations Used
2-EH 2-Ethylhexanol
ASEG for adipic ester mixture
DCHA for dicyclohexyl adipate
CHOA for cyclohexyl 2-ethylhexyl adipate
DOA for bis(2-ethylhexyl) adipate Starting Materials Used The examples use the following starting materials:

| Starting material | Producer |
|---|---|
| Homopolymeric emulsion PVC, trademark Solvin ® 367 NC | INOVYN ChlorVinyls Limited, London, UK |
| Homopolymeric emulsion PVC, trademark Vinnolit ® P 70 | Vinnolit GmbH, Ismaning, Germany |
| Isononyl benzoate, trademark Vestinol ® INB | Evonik, Marl, Germany |
| Isodecyl benzoate, trademark Jayflex ® MB 10 | Exxonmobil Chemical Belgium, Antwerp, Belgium |
| Diisononyl cyclohexanedicarboxylate, trademark Hexamoll ® DINCH ® | BASF SE, Ludwigshafen, Germany |
| Diisononyl phthalate, trademark Palatinol ® N | BASF SE, Ludwigshafen, Germany |
| Di-2-ethylhexyl adipate, trademark Plastomoll ® DOA | BASF SE, Ludwigshafen, Germany |
| Ba—Zn Stabilizer, trademark Reagens SLX/781 | Reagens S.p.A., Bologna, Italy |

A) Analytical methods

A.i) Analysis of Ester Mixture Composition

The ester mixture compositions obtained were investigated by gas chromatography (GC). For quantification, the respective areas of the GC curves were placed in relation to one another. An instrument from Agilent (Agilent 7890 B) with a DB1 column (30 m length×0.25 mm internal diameter with 1 μm coating) was used for the GC analyses.

A.ii) Determination of Melting Point

The melting point was determined by differential scanning calorimetry (DSC). This was done in each case by weighing a small sample (approximately 5 mg) out into an aluminum crucible and carrying out measurement with a heating rate of 2 K/min. The instrument used was a DSC Q2000 from TA Instruments.

A.iii) Determination of Viscosity

The dynamic viscosity was determined at 20° C. according to ASTM D7042-14 using a Stabinger viscometer from Anton-Paar.

A.iv) Determination of Density

The density was determined according to ASTM D7042-14 using a Stabinger viscometer from Anton-Paar at 20° C.

A.v) Determination of Refractive Index

The refractive index was determined according to DIN 51423-1, February 2010.

A.vi) Determination of Color Number

The Pt/Co color number was determined according to DIN EN ISO 6271-1: March 2005.

A.vii) Determination of Acid Number

The acid number was determined according to DIN EN ISO 2114:2002-06, June 2002,

A.viii) Determination of Water Content

The water content according to Karl Fischer was determined according to DIN 51777, Part 1, March 1983.

B) Synthesis of Mixed Esters of Adipic Acid

B.i) Example B1

An oil-heated 1.6 L jacketed glass reactor with gas introduction tube, three-stage cross-arm stirrer, top-mounted column (5 Montz packings A3-1000, Material 2.4610, dimensions 41×50 mm; number of theoretical plates about 20-25 per meter), condenser, oil-filled fermentation tube to exclude air, and water separator was charged under a nitrogen atmosphere with adipic acid (409 g, 2.8 mol), cyclohexanol (757 g, 7.56 mol), and 2-ethylhexanol (109 g, 0.84 mol). The resulting mixture was heated to boiling under atmospheric pressure (to start with at about 160° C., at the end 200° C.) and then admixed with a catalytic amount of Tyzor TPT 20 B (mixture of 80% isopropyl titanate and 20% butyl titanate; 0.63 g, 2.22 mmol). The water formed was separated in the separator from the alcohols, which were returned to the reactor via the column. The progress of reaction was monitored by weighing the water separated, by gas chromatography measurements, and by regularly determining the acid number of the reaction mixture. The acid number was determined by automatic titration of the reaction mixture with methanolic tetrabutylammonium hydroxide solution, with the end point being determined potentiometrically.

After 6 hours, gas chromatography showed neither adipic acid nor monoesters thereof, and the acid number of the reaction mixture was <0.05 mg KOH/g, whereupon the reaction was ended.

To remove the catalyst, 2% by weight of aqueous sodium hydroxide solution (5.70 g) were added at 80° C. and the mixture was stirred for 10 minutes. In addition a further 45 mL of water were added and the mixture was again stirred for 10 minutes. The water added was removed by distillation (100° C., 170 mbar), and the crude product was cooled to room temperature and then filtered on a pressure suction filter with Seitz K100 filter plate (max. 3 bar).

Excess alcohols were removed by steam distillation (1 bar steam, 140 to 200° C.) under a nitrogen atmosphere. Treatment of the crude product with activated carbon (1 g) and repeat filtration gave a mixture of dicyclohexyl adipate (DCHA), cyclohexyl 2-ethylhexyl adipate (CHOA), and bis(2-ethylhexyl) adipate (DOA).

The composition contained 69.5% DCHA, 27.1% CHOA, and 2.6% DOA.

This composition is also referred to as "adipic ester mixture 90:10".

The properties of the composition were as follows:
acid number: 0.05 mg KOH/g
color number: 65
melting point: 30° C.
crystallization: after several days at room temperature
density: 1.0114 g/cm$^3$
refractive index: 1.4681
water content: 0.077 g/100 g Density, refractive index and color number were determined on a sample which had been melted and then cooled to 20° C. beforehand.

B.ii) Example B2

In the same way as in example 1, a further ester mixture of adipic acid was prepared from adipic acid (409 g, 2.8 mol), cyclohexanol (673 g, 6.72 mol), and 2-ethylhexanol (219 g, 1.68 mol).

The composition contained 51% DCHA, 40.7% CHOA, and 7.4% DOA.

This composition is also referred to as "adipic ester mixture 80:20".

The properties of the composition were as follows:
acid number: 0.08 mg KOH/g
color number: 45
melting point: 26° C.
crystallization: after several weeks at room temperature
dynamic viscosity: 32.07 mPas
density: 0.9969 g/cm$^3$
refractive index: 1.4648
water content: 0.074 g/100 g B.iii) Example B3

In the same way as in example 1, a further ester mixture of adipic acid was prepared from adipic acid (409 g, 2.8 mol), cyclohexanol (588 g, 5.88 mol), and 2-ethylhexanol (328 g, 2.52 mol).

The composition contained 34.1% DCHA, 49.9% CHOA, and 16% DOA.

This composition is also referred to as "adipic ester mixture 70:30".

The properties of the composition were as follows:
acid number: 0.14 mg KOH/g
color number: 40
melting point: 20° C.
crystallization: no crystallization even after several months under standard conditions; instead, only by adding DCHA seed crystals or on cooling to −50° C.
dynamic viscosity: 26.5 mPas
density: 0.9851 g/cm$^3$
refractive index: 1.4618
water content: 0.0344 g/100 g B.iv) Example B4

In the same way as in example 1, a further ester mixture of adipic acid was prepared from adipic acid (409 g, 2.8 mol), cyclohexanol (567 g, 5.67 mol) and 2-ethylhexanol (355 g, 2.73 mol).

The composition contained 23.5% DCHA, 50.7% CHOA and 25.8% DOA. This composition is also referred to as "adipic ester mixture 67.5:32.5".

The properties of the composition were as follows:
dynamic viscosity: 22.7 mPas
density: 0.9727 g/cm$^3$
refractive index: 1.4588
color number: 60
acid number: 0.035 mg KOH/g
water content: 0.012 g/100 g B.v) Example B5

In the same way as in example 1, a further ester mixture of adipic acid was prepared from adipic acid (409 g, 2.8 mol), cyclohexanol (551 g, 5.5 mol) and 2-ethylhexanol (383 g, 2.94 mol).

The composition contained 22.2% DCHA, 50.1% CHOA and 27.7% DOA. This composition is also referred to as "adipic ester mixture 65:35".

The properties of the composition were as follows:
dynamic viscosity: 22.1 mPas
density: 0.971 g/cm$^3$
refractive index: 1.4582
color number: 43
acid number: 0.137 mg KOH/g
water content: 0.0987 g/100 g B.vi) Example B6

In the same way as in example 1, a further ester mixture of adipic acid was prepared from adipic acid (409 g, 2.8 mol), cyclohexanol (525 g, 5.25 mol) and 2-ethylhexanol (410 g, 3.15 mol).

The composition contained 20.6% DCHA, 50% CHOA and 29.4% DOA. This composition is also referred to as "adipic ester mixture 62.5:37.5".

The properties of the composition were as follows:
dynamic viscosity: 21.6 mPas
density: 0.9688 g/cm$^3$
refractive index: 1.4578
color number: 34
acid number: 0.022 mg KOH/g
water content: 0.054 g/100 g B.vii) Example B7

A further ester mixture of adipic acid was prepared from adipic acid (409 g, 2.8 mol), cyclohexanol (505 g, 5.04 mol), and 2-ethylhexanol (438 g, 3.36 mol). The procedure was very largely as in example 1, but before the sodium hydroxide solution was added, a third of the excess alcohols was removed under reduced pressure (200° C., 420 mbar).

The composition contained 15.6% DCHA, 48.4% CHOA, and 35.8% DOA.

This composition is also referred to as "adipic ester mixture 60:40".

The properties of the composition were as follows:
acid number: 0.02 mg KOH/g
color number: 40
melting point: not determinable
crystallization: no crystallization after several months under standard conditions; no crystallization by addition of DCHA seed crystals or on cooling to −50° C.
dynamic viscosity: 20.5 mPas
density: 0.9649 g/cm$^3$
refractive index: 1.4558
water content: 0.071 g/100 g B.viii) Example B8

In the same way as in example 1, a further ester mixture of adipic acid was prepared from adipic acid (409 g, 2.8 mol), cyclohexanol (673 g, 6.72 mol) and isononanol (242 g, 1.68 mol).

The composition contained 46% DCHA, 43.9% cyclohexyl isononyl adipate and 10.1% diisononyl adipate. This composition is also referred to as "adipic ester mixture 70:30".

The properties of the composition were as follows:
dynamic viscosity: 33.2 mPas
density: 0.9898 g/cm$^3$
refractive index: 1.4641
color number: 66
acid number: 0.068 mg KOH/g
water content: 0.121 g/100 g B.ix) Example B9

In the same way as in example 1, a further ester mixture of adipic acid was prepared from adipic acid (409 g, 2.8 mol), cyclohexanol (588 g, 5.88 mol) and isononanol (363 g, 2.52 mol).

The composition contained 26.8% DCHA, 45.6% cyclohexyl isononyl adipate and 27.6% diisononyl adipate. This composition is also referred to as "adipic ester mixture 70:30".

The properties of the composition were as follows:
dynamic viscosity: 28.2 mPas
density: 0.9715 g/cm$^3$
refractive index: 1.4604
color number: 36
acid number: 0.033 mg KOH/g
water content: 0.0611 g/100 g B.x) Summary of the Adipic Ester Mixtures Summary of the Adipic Ester Mixtures (Area % According to GC)

| | Dicyclohexyl adipate | Cyclohexyl 2-ethylhexyl adipate | Di-2-ethylhexyl adipate |
|---|---|---|---|
| Adipic ester mixture B1 (90:10) | 69.9 | 27.5 | 2.6 |
| Adipic ester mixture B2 (80:20) | 51.4 | 41.1 | 7.5 |
| Adipic ester mixture B3 (70:30) | 34.1 | 49.9 | 16 |
| Adipic ester mixture B4 (67.5:32.5) | 23.5 | 50.7 | 25.8 |
| Adipic ester mixture B5 (65:35) | 22.2 | 50.1 | 27.7 |
| Adipic ester mixture B6 (62.5:37.5) | 20.6 | 50.0 | 29.4 |
| Adipic ester mixture B7 (60:40) | 15.6 | 48.6 | 35.8 |

|  | Dicyclohexyl adipate | Cyclohexyl isononyl adipate | Diisononyl adipate |
|---|---|---|---|
| Adipic ester mixture B8 (80:20) | 46.0 | 43.9 | 10.1 |
| Adipic ester mixture B9 (70:30) | 26.8 | 45.6 | 27.6 |

C) Performance Tests

C.i) Plasticizer Compositions

Plasticizer compositions and comparative plasticizer compositions used were as follows:

| Compositions | |
|---|---|
| C01 | 100% adipic ester mixture B1 (90:10) |
| C02 | 100% adipic ester mixture B2 (80:20) |
| C03 | 100% adipic ester mixture B3 (70:30) |
| C04 | 100% adipic ester mixture B4 (67.5:32.5) |
| C05 | 100% adipic ester mixture B5 (65:35) |
| C06 | 100% adipic ester mixture B6 (62.5:37.5) |
| C07 | 100% adipic ester mixture B7 (60:40) |
| C08 | 100% adipic ester mixture B8 (80:20) |
| C09 | 100% adipic ester mixture B9 (70:30) |
| C10 | 71% Hexamoll DINCH<br>29% adipic ester mixture B1 (90:10) |
| C11 | 67% Hexamoll DINCH<br>33% adipic ester mixture B2 (80:20) |
| C12 | 63% Hexamoll DINCH<br>37% adipic ester mixture B3 (70:30) |
| C13 | 54% Hexamoll DINCH<br>46% adipic ester mixture B4 (67.5:32.5) |
| C14 | 58% Hexamoll DINCH<br>42% adipic ester mixture B5 (65:35) |
| C15 | 56% Hexamoll DINCH<br>44% adipic ester mixture B6 (62.5:37.5) |
| C16 | 54% Hexamoll DINCH<br>46% adipic ester mixture B7 (60:40) |
| C17 | 63% Hexamoll DINCH<br>37% adipic ester mixture B8 (80:20) |
| C18 | 54% Hexamoll DINCH<br>46% adipic ester mixture B9 (70:30) |
| C19 [a] | 45% Hexamoll DINCH<br>55% Vestinol INB |
| C20 [a] | 33% Hexamoll DINCH<br>67% Jayflex MB10 |

[a] Comparative example

Additionally the following comparative plasticizers were used:

| C21 [a] | 100% Palatinol N |
|---|---|
| C22 [a] | 100% Hexamoll DINCH |
| C23 [a] | 100% Plastomoll DOA |
| C24 [a] | 100% dicyclohexyl adipate |

[a] Comparative example

In the text below, unless otherwise indicated, plasticizer composition refers collectively both to the stated plasticizer compositions and to the stated 1-component plasticizers.

C.ii) Determination of the Gelling Behavior of PVC Plastisols

The gelling behavior of PVC plastisols was studied by producing plastisols each comprising one of the above-stated plasticizer compositions. The formula used here was as follows:

| Ingredient | Proportion [phr] |
|---|---|
| PVC (mixture of 70 parts by weight homopolymeric emulsion PVC, trademark Solvin® 367 NC, and 30 parts by weight homopolymeric emulsion PVC, trademark Vinnolit® P 70) | 100 |
| Plasticizer composition or plasticizer | 100 |
| Ba—Zn stabilizer, Reagens SLX/781 | 2 |

The plastisols were produced by weighing out the two types of PVC together in a PE (polyethylene) beaker. The liquid components were weighed out into a second PE beaker. Using a dissolver (Jahnke & Kunkel, IKA Werk, model RE-166 A, 60-6000 1/min, dissolver disk diameter=40 mm), at 400 rpm, the PVC was stirred into the liquid components. When a plastisol had formed, the rotary speed was increased to 2500 1/min and the mixture was homogenized for 150 s. The plastisol was transferred from the PE beaker into a steel dish, which was exposed to a pressure of 10 mbar in a desiccator. This operation removed the air in the plastisol. Depending on air content, the plastisol underwent greater or lesser expansion. The desiccator was shaken at this stage to disrupt the surface of the plastisol and cause it to collapse. From this juncture, the plastisol was left in the desiccator under a pressure of 10 mbar for a further 15 min. The vacuum pump was then switched off, the desiccator was aerated, and the plastisol was transferred back into the PE beaker. The resulting plastisol was used for the rheological measurements. For all of the plastisols, measurement commenced 30 minutes after homogenization.

In order to gel a liquid PVC plastisol and to convert the condition of PVC particles in homogeneous dispersion in plasticizer into a homogeneous, solid flexible-PVC matrix, the energy required must be supplied in the form of heat. In a processing operation, the parameters of temperature and residence time are available for this purpose. The faster the gelling (indicated here by the solvation temperature, i.e. the lower said temperature, the more rapidly the material gels), the lower the temperature that can be selected (for a given residence time) or the lower the residence time that can be selected (for a given temperature).

The gelling behavior of a plastisol was studied by an internal method using an Anton Paar MCR302 rheometer. In this method, the viscosity of the paste was measured on heating under constant, low shear (oscillation).

Parameters used for the oscillation tests were as follows:
measurement system: parallel plates, 50 mm diameter
amplitude: 1%
frequency: 1 Hz
gap width: 1 mm
starting temperature: 20° C.
temperature profile: 20° C. to 200° C.
heating rate: 10 K/min
number of measurement points: 201
duration of measurement for each measurement point: 0.09 min Measurement took place in two steps. The first step served to condition the sample to temperature. At 20° C., the plastisol was exposed to a low shear for 2 min at constant amplitude (gamma) with $\gamma=1\%$. In the second step, the temperature program was used. At measurement, the storage modulus and the loss modulus were recorded. The complex viscosity $\eta^*$ was calculated from these two variables. The temperature at which the complex viscosity reached its maximum was termed the gelling temperature of the plastisol.

C.iii) Determination of the Process Volatility During Processing of Plastisols

Process volatility refers to the weight loss of plasticizer during the processing of plastisols. As described under C.ii), plastisols were produced each comprising one of the above-stated plasticizer compositions. The formula used was as follows:

| Ingredient | Proportion [phr] |
|---|---|
| PVC (mixtures of 70 parts by weight homopolymeric emulsion PVC, trademark Solvin ® 367 NC, and 30 parts by weight homopolymeric emulsion PVC, trademark Vinnolit ® P 70) | 100 |
| Plasticizer composition or plasticizer | 60 |
| Ba—Zn stabilizer, Reagens SLX/781 | 2 |

Production of a Foil Precursor

In order to allow determination of the performance properties from the plastisols, the liquid plastisol must be converted to a processable solid foil. For this purpose, the plastisol was pre-gelled at low temperature. Gelling of the plastisols took place in a Mathis oven.

The settings used on the Mathis oven were as follows:
exhaust air: flap completely open
fresh air: open
air circulation: maximum position
upper air/lower air: upper air setting 1

A new release paper was clamped into the Mathis oven's clamping apparatus. The oven was preheated to 140° C. and the gelling time was set to 25 s. The gap was set by using the thickness template to adjust the gap between paper and doctor to 0.1 mm. The thickness dial gauge was set to 0.1 mm. The gap was then adjusted to a value of 0.7 mm on the dial gauge.

The plastisol was applied to the paper and spread smoothly by the doctor. The clamping apparatus was then moved into the oven via the start button. After 25 s, the clamping apparatus was moved back out again. The plastisol had gelled, and the resultant foil was subsequently peeled in one piece from the paper. The thickness of this foil was about 0.5 mm.

Determination of the Process Volatility

Process volatility was determined by using a metal Shore hardness punch to punch 3 square test specimens (49 mm×49 mm) in each case from the foil precursor, weighing these squares, and then gelling them in the Mathis oven at 190° C. for 2 minutes. After cooling, these specimens were weighed again and the weight loss in % was calculated. For this purpose, the specimens were always positioned exactly at the same location on the release paper.

C.iv) Determination of the Foil Volatility of Plastisol Foils

Foil volatility is a measure of the volatility of a plasticizer in the finished plasticized PVC article. For the testing of foil volatility, plastisols each comprising plasticizer compositions were produced as described under C.ii).

For the tests, however, in this case, instead of the production first of a foil precursor, the plastisol was gelled directly in the Mathis oven at 190° C. for 2 min. Foil volatility testing was carried out on the resulting foils, whose thickness was about 0.5 mm.

Testing of the foil volatility over 24 h at 130° C.

Foil volatility was determined by cutting four individual foils (150 mm×100 mm) from the plastisols gelled at 1900° C. for 2 min, and perforating and weighing these foils. The foils were suspended on a rotating light-refracting element in a Heraeus 5042E drying oven set at 130° C. The air in the oven was changed 18 times per hour. This corresponds to 800 l/h of fresh air. After 24 hours in the oven, the foils were removed and reweighed. The weight loss in percent indicates the foil volatility of the compositions.

C.v) Determination of the Shore A Hardness of Foils Produced from Plastisols

The Shore A hardness is a measure of the elasticity of plasticized PVC articles. The lower the Shore hardness, the greater the elasticity of PVC articles. For the determination of the Shore A hardness, as described under C.iii), foil sections measuring 49 mm×49 mm were punched from the foil precursors and gelled in each case in groups of three at 190° C. for 2 min in the same way as for the volatility test. A total of 27 foil pieces were gelled in this way. These 27 foil pieces were placed atop one another in a pressed frame and pressed at 195° C. to give a Shore block 10 mm thick.

Description of the Shore hardness measurement:
Method: DIN EN ISO 868, October 2003
Title: Determination of indentation hardness by means of a durometer (Shore hardness)
Apparatus: Hildebrand DD-3 digital durometer
Specimens:
Dimensions: 49 mm×49 mm×10 mm (length×width×thickness)
Production: pressed from about 27 gel foils 0.5 mm thick
Press temperature: 195° C.=5° C. above the production of the gel foils
Storage time before measurement: 7 d in climate chamber at 23° C. and 50% rel. humidity
Measurement time: 15 s (time for which needle remains on the specimen before the value is read off)
10 individual values are measured and the average value is calculated from them.

The Shore A hardness measurement value was read off after 15 seconds in each case.

C.vi) Mechanical Values

The mechanical properties of plasticized PVC items were characterized using, inter alia, the elongation at break, 100% modulus and breaking stress. The higher the elongation at break, the better the mechanical properties of the plasticized PVC item. For 100% modulus and breaking stress, lower values are indicative of a better property of the plasticizer. For these tests, however, a foil precursor was not initially prepared, but rather the plastisol was directly gelled for 2 min at 190° C. in a Mathis oven. The tests of elongation at break, 100% modulus and breaking stress were carried out on the approximately 0.5 mm thick foils produced in this way.

The parameters of elongation at break, 100% modulus and breaking stress were determined according to DIN EN ISO 527, part 1 and 3. In detail, the procedures were carried out as follows:
Machine: Zwicki, type TMZ 2.5/TH1S,
Methods: Test according to DIN EN ISO 527 part 1 (June 2012) and part 3 (July 2003),
Test specimens: Foil strips type 2 according to DIN EN ISO 527 part 3, 150 mm long, 15 mm wide, punched out,
Number of test specimens: 10 samples were measured per test,
Climate: Standard climate 23° C. (+1-1° C.), 50% atmospheric humidity,
Storage time: 7 days in standard climate before measurement,
Clamping: Smooth-convex with 6 bar clamping pressure,
Clamping length: 100 mm, Measurement length: Measurement carried out over the crosshead, i.e. the clamping length is equal to the measurement length=100 mm, Testing speed: 100 mm/min.

C.vii) Determining the Compatibility (Permanence) of Foils

Purpose of the Test Method

The test serves for the qualitative and quantitative measurement of the compatibility of flexible PVC formulas. It is carried out at elevated temperature (70° C.) and air humidity (100% relative humidity). The data obtained are evaluated against storage time.

Test Specimens

For standard testing, 10 test specimens (foils) with a size of 75 mm×110 mm×0.5 mm were used per formula. The foils were perforated along the broad side, inscribed and weighed. The inscription must be wipe-proof and can for example be produced using a soldering iron.

Test Apparatus

Heating cabinet, analytical balance, temperature measuring device with probe for measuring the interior temperature of the heating cabinet, glass bowl, metal stand made of rust-proof metal.

Test Parameters

Test temperature: 70° C.

Test medium: steam formed at 70° C. from fully demineralized water

Procedure

The temperature in the interior of the heating cabinet was set to the required 70° C. The test foils were suspended on a wire frame and placed into a glass trough filled approx. 5 cm high with water (demin. water). The foils must not hang in the water. Only foils of the same composition are to be kept in one labeled and numbered bowl, in order to avoid reciprocal influences and to facilitate removal after the respective storage times.

The glass trough was sealed steam-tight with a polyethylene foil so that the steam that formed later in the glass trough was unable to escape.

Storage Time

Following a rhythm of 1, 3, 7, 14 and 28 days, in each case 2 foils (duplicate determination) were removed from the glass trough and climatized for 1 hour freely hanging in the air. Then, the foils were cleaned on the surface with methanol (with a hand towel moistened with methanol). The foils were then dried freely hanging for 16 h at 70° C. in a drying cabinet (natural convection). After removal from the drying cabinet, the foils were conditioned freely hanging in the laboratory for 1 hour and then weighed. The arithmetic mean of the weight changes relative to the samples before they were placed in the heating cabinet was given in each case as test result.

D) Performance Tests, Results

D.i) Gelling Behavior

Figure 4:
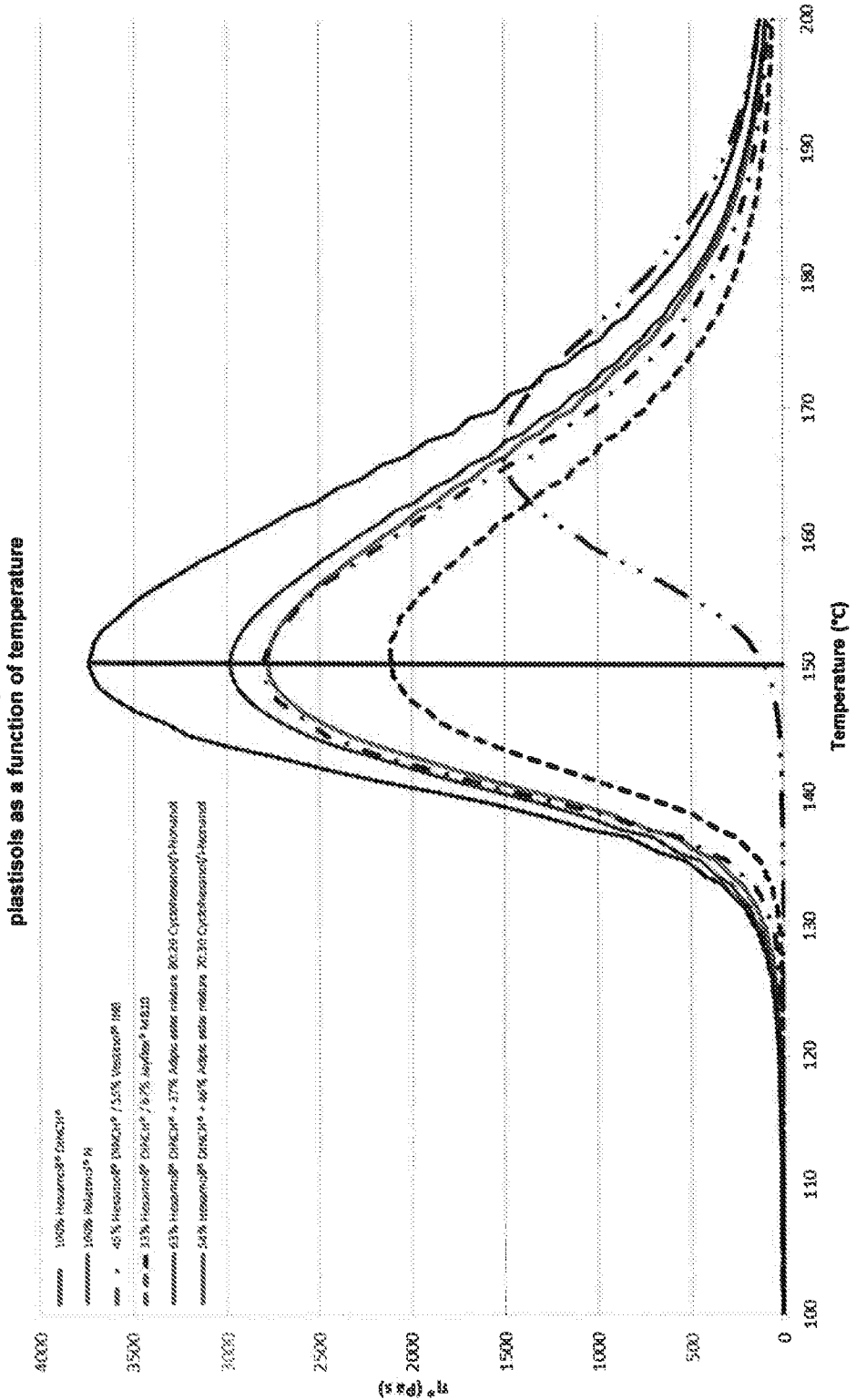
FIG. 4 shows the gelling behavior of PVC plastisols comprising various mixtures of Hexamoll DINCH® and adipic ester mixtures, having isopropanol and cyclohexanol as alcohol component, as their plasticizer component, and also that of comparative PVC plastisols comprising Hexamoll® DINCH® or Palatinol® N.

The gelling behavior was determined as described under C.ii). The above-stated plasticizer compositions C001 to C13 were used here. The results are shown in FIGS. 1 and 4.

FIG. 1, for the gelling behavior of plastisols comprising one of the plasticizer compositions C01 to C07, shows improved properties in comparison to the plastisols containing the comparative plasticizers C21 or C22.

Figure 2:
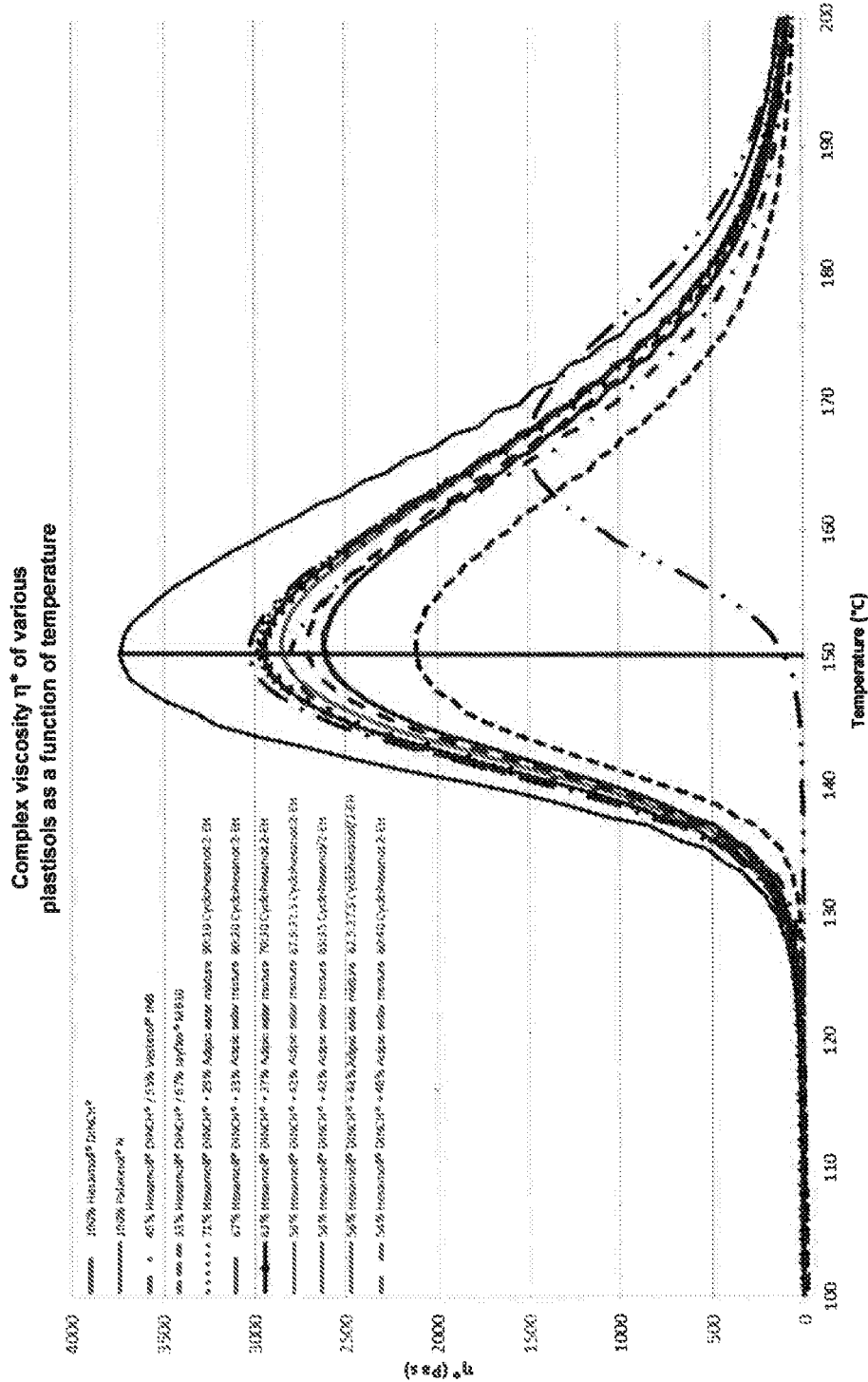
FIG. 2 shows the gelling behavior of PVC plastisols comprising various mixtures of Hexamoll DINCH® and adipic ester mixtures, having 2-ethylhexanol and cyclohexanol as alcohol component, as their plasticizer component, and also that of comparative PVC plastisols comprising Hexamoll® DINCH® or Palatinol® N.

FIG. 2, for the gelling behavior of plastisols comprising one of the plasticizer compositions C10 to C16, shows comparable properties in comparison to plastisols containing the comparative plasticizer compositions C19, C20, and C21, and improved properties in comparison to the plastisol containing the comparative plasticizer C22.

Figure 3:
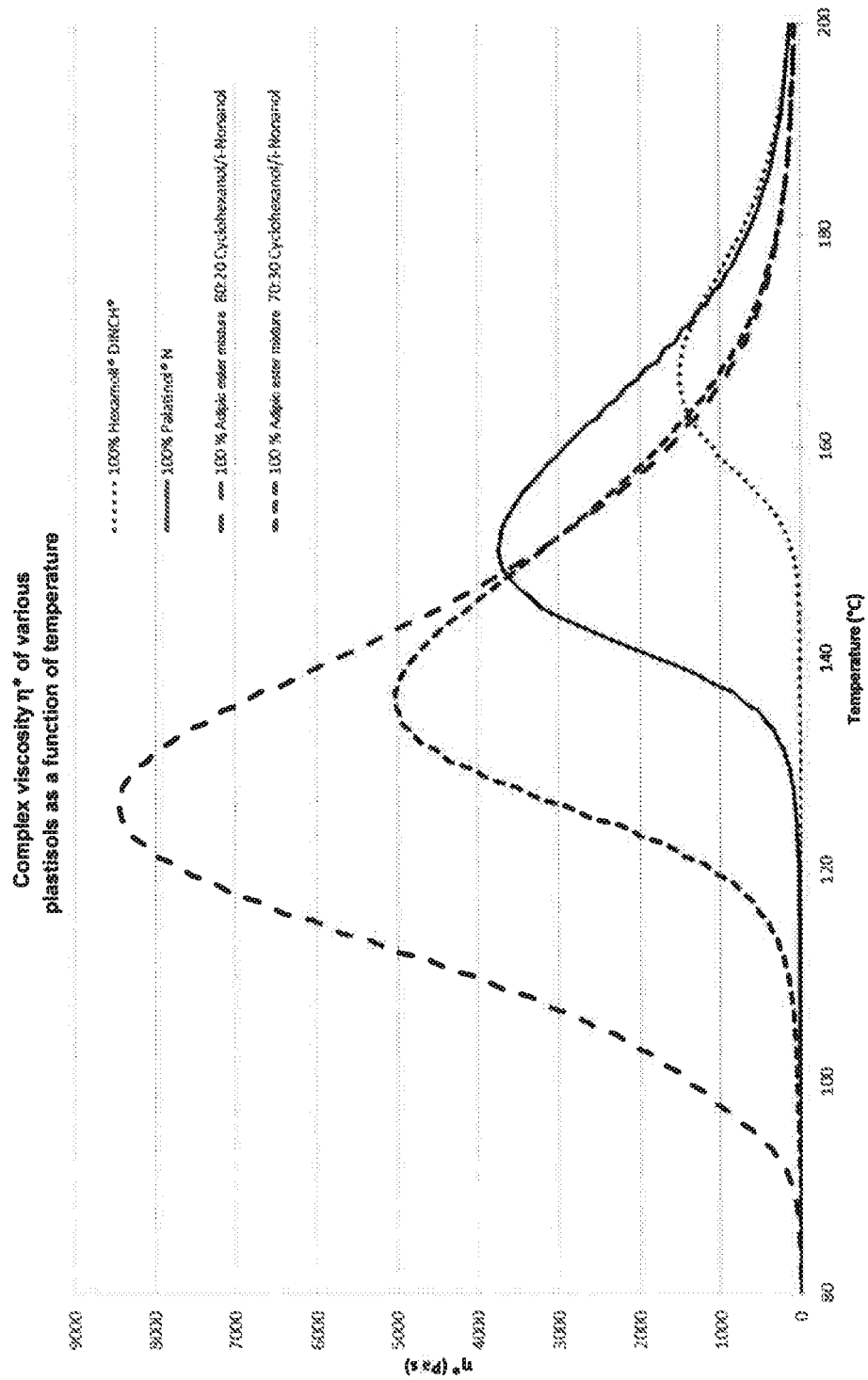
FIG. 3 shows the gelling behavior of PVC plastisols comprising adipic ester mixtures, having isopropanol and cyclohexanol as alcohol component, as their plasticizer component, and also that of comparative PVC plastisols comprising Hexamoll® DINCH® or Palatinol® N.

FIG. 3, for the gelling behavior of plastisols comprising one of the plasticizer compositions C08 to C09, shows improved properties in comparison to the plastisols containing the comparative plasticizers C21 or C22.

FIG. 4, for the gelling behavior of plastisols comprising one of the plasticizer compositions C17 to C18, shows comparable properties in comparison to plastisols containing the comparative plasticizer compositions C19, C20, and C21, and improved properties in comparison to the plastisol containing the comparative plasticizer C22.

D.ii) Process Volatility

The process volatility was determined as described under C.iii). The above-stated plasticizer compositions C03 and C07 to C09, C10 to C12 and C16 to C22 were here.

Process Volatility (Loss of Mass) of the Adipic Ester Mixtures

|  |  | Loss of mass [%] |
| --- | --- | --- |
| C03 | 100% adipic ester mixture B3 (70:30) | 4.2 |
| C07 | 100% adipic ester mixture B7 (60:40) | 4.3 |
| C08 | 100% adipic ester mixture B8 (80:20) | 3.6 |
| C09 | 100% adipic ester mixture 89 (70:30) | 3.1 |

Figure 5:
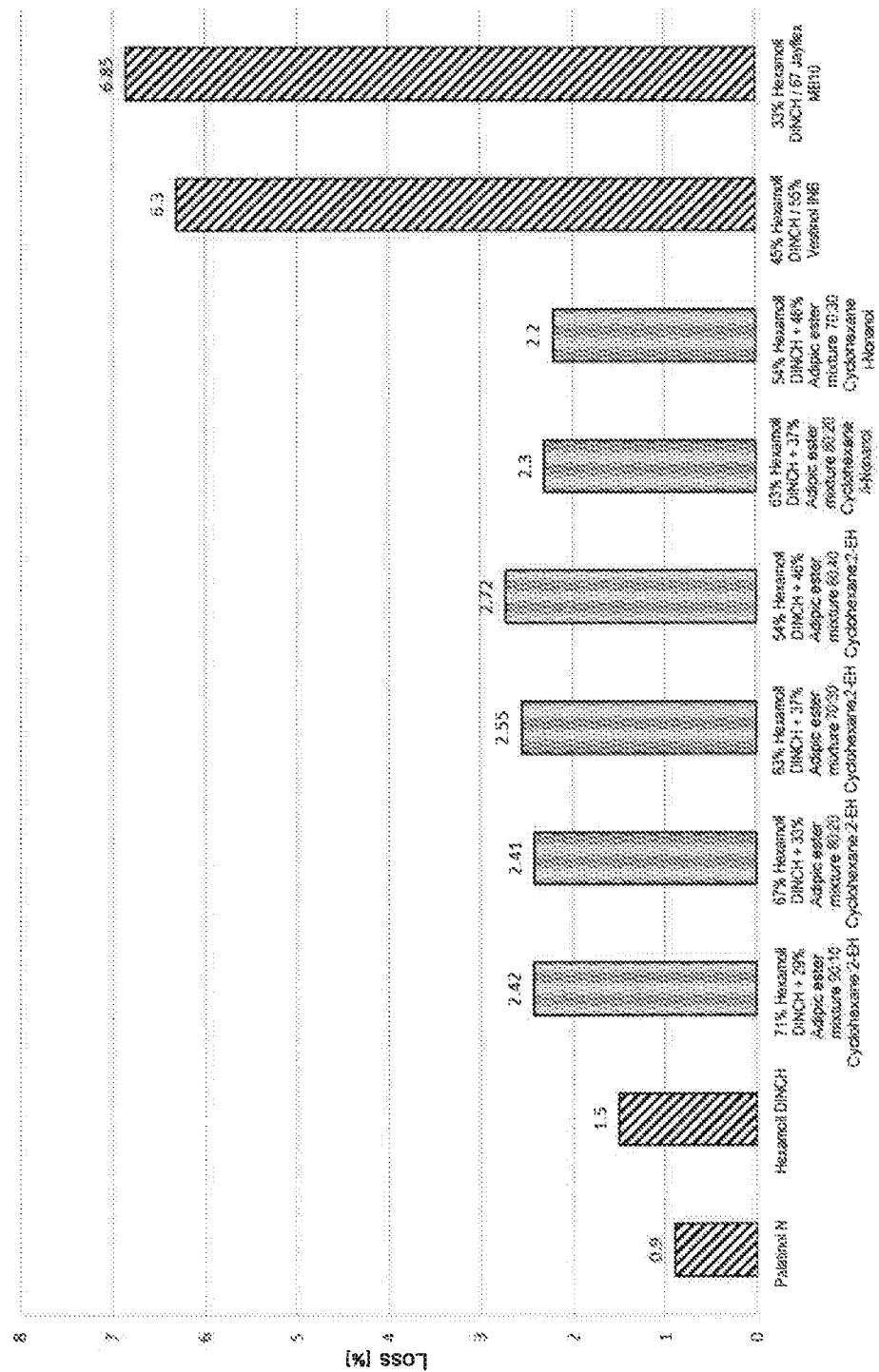
FIG. 5 shows the process volatility of PVC plastisols comprising as their plasticizer component in each case different mixtures of Hexamoll® DINCH® and adipic ester mixtures, and also that of comparative PVC plastisols comprising Palatinol® N, Hexamoll@ DINCH®, a mixture of Hexamoll@ DINCH® and Vestinol INB, or a mixture of Hexamoll@ DINCH® and Jayflex MB10.

FIG. 5, for the PVC plastisols comprising one of the plasticizer compositions C10 to C12 and C16 to C18, shows an advantageous, much lower process volatility in comparison to PVC plastisols containing one of the comparative plasticizer compositions C19 to C20. The process volatility of the PVC plastisols comprising one of the plasticizer compositions C10 to C12 and C16 to C18, however, is higher than that of the PVC plastisols comprising the comparative plasticizers C21 or C22.

At the processing stage, therefore, much less plasticizer is lost from the PVC plastisols of the invention than in the case of PVC plastisols comprising comparative plasticizer compositions with a plurality of components.

D.iii) Foil Volatility

The foil volatility was determined as described under C.iv). The above-stated plasticizer compositions C03, C07 to C09, C10 to C12 and C16 to C22 were used here.

Foil Volatility (Loss of Mass) of the Adipidic Ester Mixtures

|  |  | Loss of mass [%] |
| --- | --- | --- |
| C03 | 100% adipic ester mixture B3 (70:30) | 11.6 |
| C07 | 100% adipic ester mixture B7 (60:40) | 10.7 |
| C08 | 100% adipic ester mixture B8 (80:20) | 9.6 |
| C09 | 100% adipic ester mixture B9 (70:30) | 7.3 |

Figure 6:
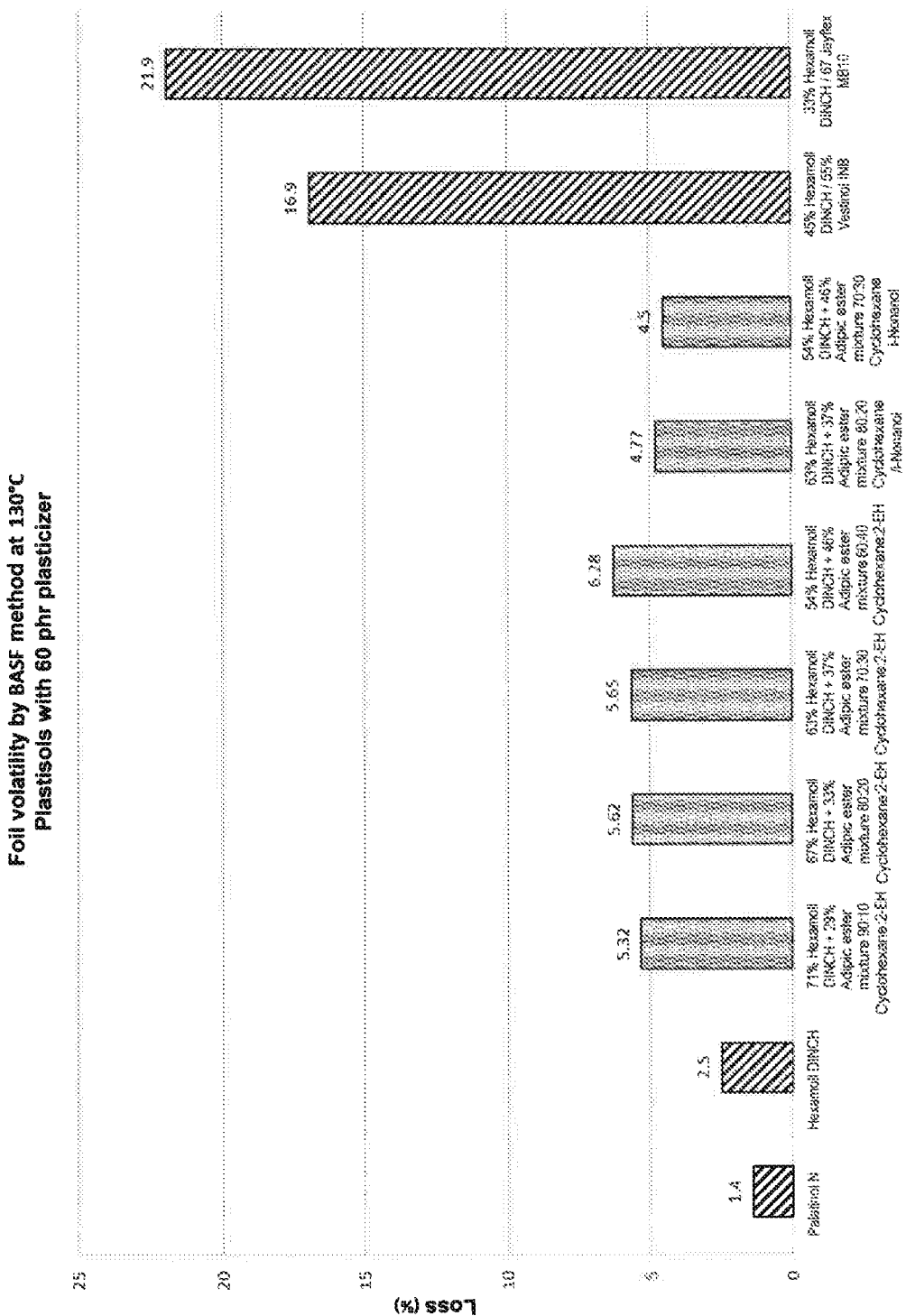
FIG. 6 shows the foil volatility of PVC foils produced from plastisols comprising as their plasticizer component different mixtures of Hexamoll DINCH® and adipic ester mixtures, and also that of comparative PVC foils produced from plastisols comprising Palatinol® N, Hexamoll® DINCH®, a mixture of Hexamoll@ DINCH® and Vestinol INB, or a mixture of Hexamoll® DINCH® and Jayflex MB10.

FIG. 6, for foils comprising the plasticizer compositions C10 to C12 and C16 to C18, shows an advantageous, much lower foil volatility in comparison to the foils comprising one of the comparative plasticizer compositions C19 to C20. The foil volatility of the foils comprising one of the plasticizer compositions C10 to C12 and C16 to C18, however, is higher than that of the foils comprising the comparative plasticizers C21 or C22.

The foils of the plastisols of the invention therefore lose much less plasticizer than the foils comprising the comparative plasticizer compositions having a plurality of components.

D.iv) Shore A Hardness

The Shore A hardness was determined as described under C.v). The above-stated plasticizer compositions C03, C07 to C09, C12 and C16 to C24 were used here. The results are shown in FIGS. 7 and 8.

Figure 7:
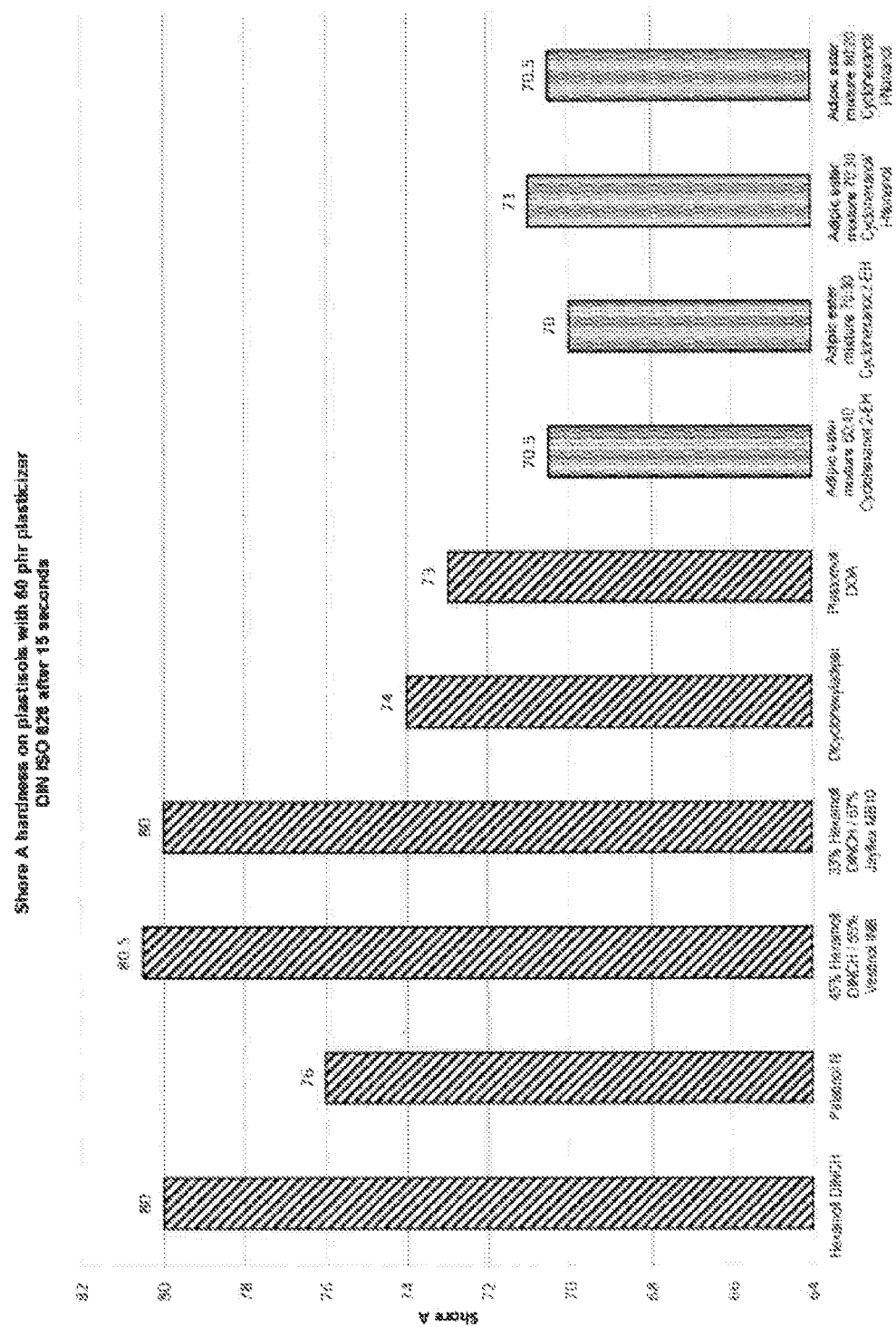
FIG. 7 shows the Shore A hardness of PVC foils produced from plastisols comprising as their plasticizer component adipic ester mixtures, and also that of comparative PVC foils produced from plastisols comprising Palatinol® N, Hexamoll® DINCH®, dicyclohexyl adipate, Plastomoll DOA, a mixture of Hexamoll® DINCH® and Vestinol INB, or a mixture of Hexamoll@ DINCH® and Jayflex MB10.

FIG. 7, for the Shore A hardness of films comprising the plasticizer compositions C03 and C07 to C09, shows an advantageous, lower Shore A hardness in comparison to foils comprising the comparative plasticizer compositions C19 to C24.

Figure 8:
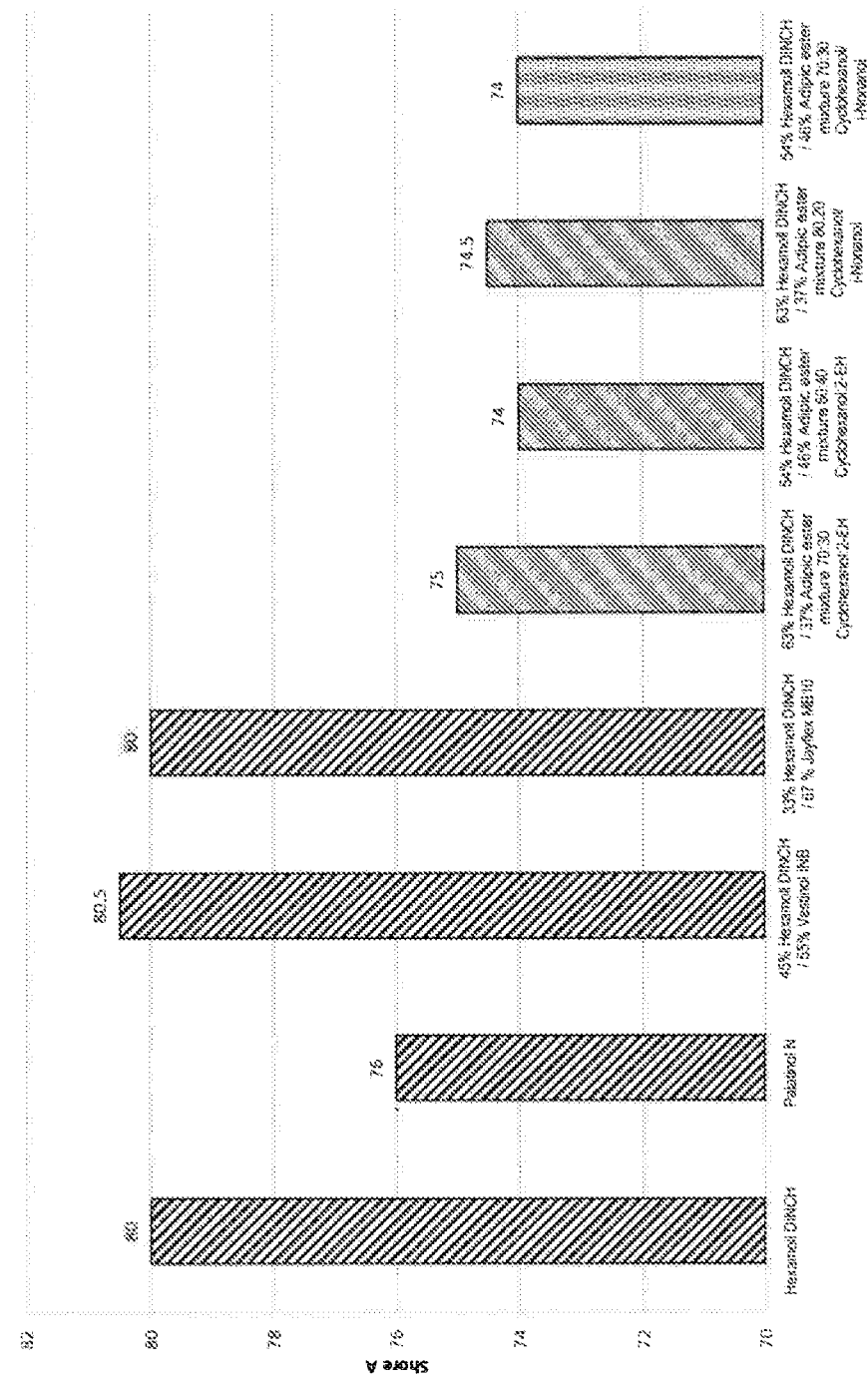
FIG. 8 shows the Shore A hardness of PVC foils produced from plastisols comprising as their plasticizer component various mixtures of Hexamoll DINCH® and adipic ester mixtures, and also that of comparative PVC foils produced from plastisols comprising Palatinol® N, Hexamoll® DINCH®, a mixture of Hexamoll@ DINCH® and Vestinol INB, or a mixture of Hexamoll® DINCH® and Jayflex MB10.

FIG. 8, for the Shore A hardness of films comprising the plasticizer compositions C12 and C16 to C18, shows an advantageous, lower Shore A hardness in comparison to foils comprising the comparative plasticizer compositions C19 to C22.

The foils of the plastisols of the invention, accordingly, exhibit high elasticity on the part of the PVC items.

D.v) Mechanical Values

The mechanical properties were determined as described under C vi).

The table below gives the results of the test of the plasticizer compositions C12 and C16 to C18. It should be noted that the mechanical values of the plasticizer compositions C12 and C16 to C18 give similarly good values to the plasticizer compositions of the commercially available plasticizers of the plasticizer compositions C21 and C22.

|  |  | Breaking stress [MPa] | 100% modulus [%] | Elongation at break [%] |
|---|---|---|---|---|
| C12 | 63% Hexamoll DINCH 37% Adipic ester mixture B3 (70:30) | 15.1 | 6.6 | 325 |
| C16 | 54% Hexamoll DINCH 46% Adipic ester mixture B7 (60:40) | 14.6 | 6.2 | 336 |
| C17 | 63% Hexamoll DINCH 37% Adipic ester mixture B8 (80:20) | 15.9 | 6.6 | 344 |
| C18 | 54% Hexamoll DINCH 46% Adipic ester mixture B9 (70:30) | 15.9 | 6.5 | 352 |
| C21 | 100% Palatinol N | 16.8 | 6.8 | 345 |
| C22 | 100% Hexamoll DINCH | 17 | 7.4 | 340 |

D.vi) Compatibility

The compatibility was determined as described under C vii).

Figure 9:
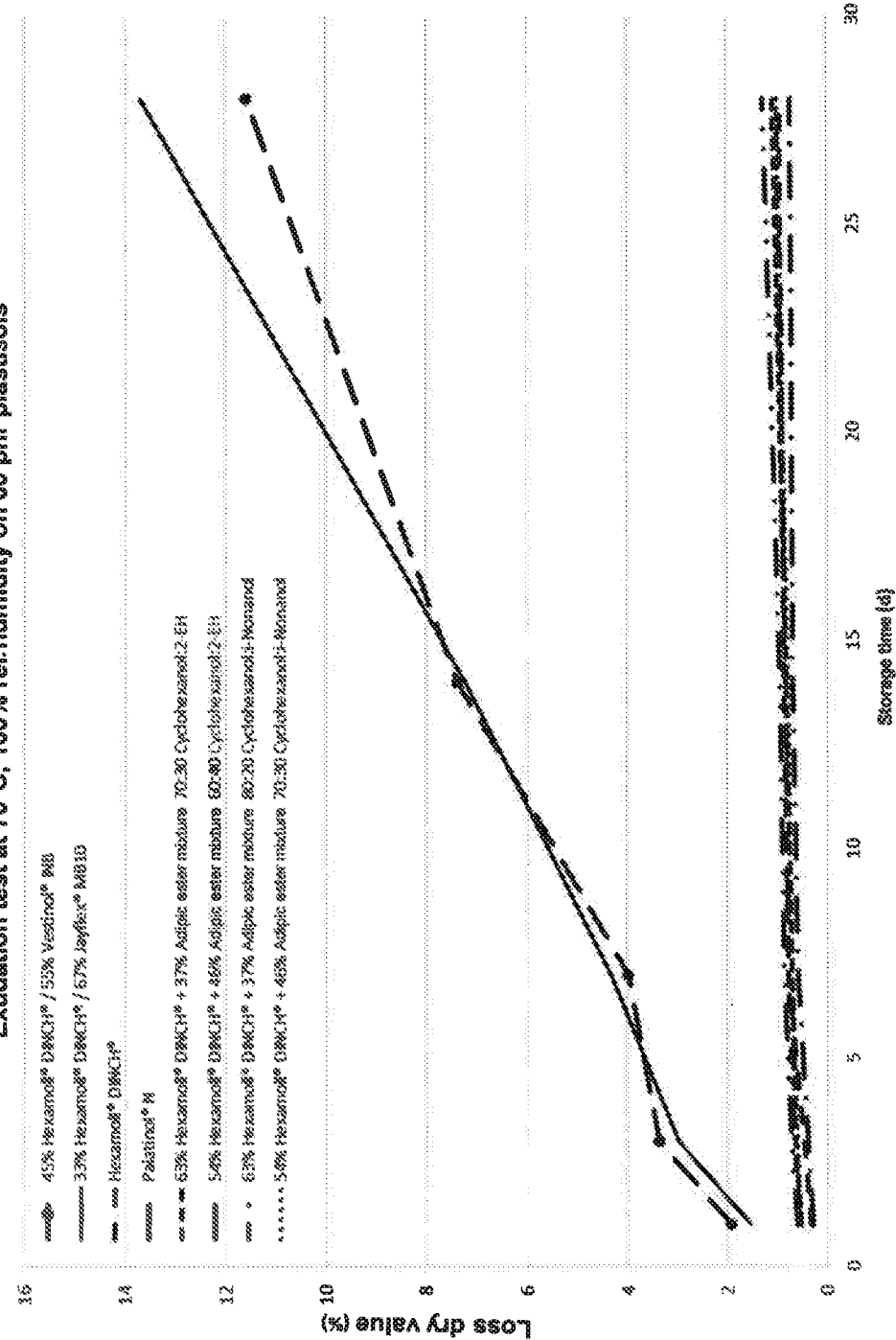
FIG. 9 shows the compatibility behavior of PVC foils produced from plastisols comprising as their plasticizer component various mixtures of Hexamoll DINCH® and adipic ester mixtures, and also that of comparative PVC foils produced from plastisols comprising Palatinol® N, Hexamoll® DINCH®, a mixture of Hexamoll® DINCH® and Vestinol INB, or a mixture of Hexamoll® DINCH® and Jayflex MB10.

FIG. 9 shows the results of the test of the plasticizer compositions C12, C16 to C18 and C19 to C22 as comparative compositions. It should be noted that the plasticizer compositions C12, C16 to C18 and C21 and C22 have very good compatibility with PVC; on the contrary, the plasticizer compositions C21 and C22 have very poor compatibility with PVC. The foils of the inventive plastisols consequently have better compatibility with PVC.

What is claimed is:

1. A polymer composition comprising
A) one or more polymer(s) selected from PVC homopolymers and copolymers,
with the proviso that the polymer composition comprises 50 to 100% by weight, based on the total amount of polymers in the polymer composition, of at least one polymer which is selected from PVC homopolymers and copolymers,
and
B1) one or more compound(s) of the formula (I)

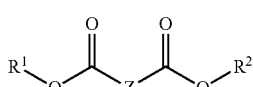

(I)

in which
Z is an unbranched or branched $C_2$-$C_8$-alkylene group or is an unbranched or branched $C_2$-$C_8$-alkenylene group, comprising at least one double bond, and
$R^1$ is a saturated, unbranched or branched $C_7$-$C_{12}$-alkyl moiety, and
$R^2$ is a saturated $C_3$-$C_8$-cycloalkyl group, the cycloalkyl moieties mutually independently being either unsubstituted or substituted by at least one $C_1$-$C_{10}$-alkyl moiety.

2. The polymer composition according to claim 1, further comprising
B2) one or more compound(s) of the formula (II.a)

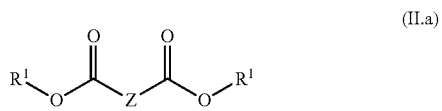

(II.a)

and/or
B3) one or more compound(s) of the formula (II.b)

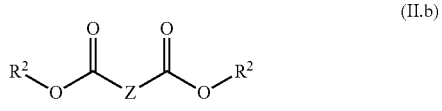

(II.b)

in which
Z is an unbranched or branched $C_2$-$C_8$-alkylene group or is an unbranched or branched $C_2$-$C_8$-alkenylene group, comprising at least one double bond, and
$R^1$ is a saturated, unbranched or branched $C_7$-$C_{12}$-alkyl moiety, and
$R^2$ is a saturated $C_3$-$C_8$-cycloalkyl moiety, the cycloalkyl moieties mutually independently being either unsubstituted or substituted by at least one $C_1$-$C_{10}$-alkyl moiety.

3. The polymer composition according to claim 2, the amount of compounds of the formula (I) in the polymer composition being 10 to 75% by weight, based on the total weight of the plasticizer components B1, B2 and B3 in the composition.

4. The polymer composition according to claim 2, the total amount of compounds of the formulae (II.a) and (II.b) in the polymer composition being 25 to 90% by weight, based on the total weight of the plasticizer components B 1, B2 and B3 in the composition.

5. The polymer composition according to claim 2, the weight ratio between the total weight of the compounds of the formula (I) and the total weight of the compounds of the formulae (II.a) and (II.b) being in the range from 1:9 to 3:1.

6. The polymer composition according to claim 1,
$R^2$ being a saturated $C_5$-$C_7$-cycloalkyl moiety, the cycloalkyl moieties mutually independently being either unsubstituted or substituted by at least one $C_1$-$C_{10}$-alkyl moiety.

7. The polymer composition according to claim 1,
Z being an unbranched $C_3$-$C_8$-alkylene group.

8. The polymer composition according to claim 1, further comprising
C) one or more further plasticizers selected from dialkyl 1,2-cyclohexanedicarboxylates, dialkyl phthalates, or dialkyl terephthalates.

9. The polymer composition according to claim 1, the polymer composition comprising at least one further plasticizer D), different from the components B) and C) and selected from
alkyl aralkyl phthalates,
trialkyl trimellitates,
alkyl benzoates,
dibenzoic esters of glycols,
hydroxybenzoic esters,
esters of saturated monocarboxylic acids,
esters of unsaturated monocarboxylic acids,
esters of hydroxymonocarboxylic acids,
esters of dicarboxylic acids,
esters of saturated hydroxydicarboxylic acids,
amides and esters of aromatic sulfonic acids,
alkylsulfonic esters,
glycerol esters,
isosorbide esters,
phosphoric esters,
citric diesters and citric triesters,
alkylpyrrolidone derivatives,
2,5-furandicarboxylic esters,
2,5-tetrahydrofurandicarboxylic esters,
epoxidized vegetable oil,
epoxidized fatty acid monoalkyl esters,
dialkyl 1,3-cyclohexanedicarboxylates,
dialkyl 1,4-cyclohexanedicarboxylates,
polyesters of aliphatic and/or aromatic polycarboxylic acids with at least dihydric alcohols,
further plasticizers.

10. The polymer composition according to claim 1, comprising at least one further polymer selected from
homopolymers or copolymers comprising in polymerized form at least one monomer selected from $C_2$-$C_{10}$-monoolefins, 1,3-butadiene, 2-chloro-1,3-butadiene, vinyl alcohol and its $C_2$-$C_{10}$-alkyl esters, vinylidene chloride, vinylidene fluoride, tetrafluoroethylene, glycidyl acrylate, glycidyl methacrylate, acrylates and methacrylates of $C_1$-$C_{10}$-alcohols, vinylaromatics, acrylonitrile, methacrylonitrile, maleic anhydride and α,β-ethylenically unsaturated monocarboxylic and dicarboxylic acids,
homopolymers and copolymers of vinyl acetals,
polyvinyl esters
polycarbonates,
polyesters,
polyethers,
polyetherketones,
thermoplastic polyurethanes,
polysulfides,
polysulfones,
polyethersulfones,
cellulose alkyl esters,
or mixtures thereof.

11. The polymer composition according to claim 1, the total amount of components B1 and, if present, B2, B3, C and D in the polymer composition being 5.0 to 300 phr, based on the total amount of PVC homopolymers and copolymers.

12. A polymer composition comprising
A) one or more polymer component(s) selected from thermoplastic polymers and elastomers and also mixtures thereof,
B1) one or more compound(s) of the formula (I)

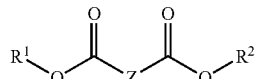

(I)

wherein
Z is an unbranched or branched $C_2$-$C_8$-alkylene group or is an unbranched or branched $C_2$-$C_8$-alkenylene group, comprising at least one double bond, and
$R^1$ is a saturated, unbranched or branched $C_7$-$C_{12}$-alkyl moiety, and
$R^2$ is a saturated $C_3$-$C_8$-cycloalkyl group, the cycloalkyl moieties mutually independently being either unsubstituted or substituted by at least one $C_1$-$C_{10}$-alkyl moiety, and
C) one or more further plasticizer(s) selected from
dialkyl 1,2-cyclohexanedicarboxylates,
dialkyl phthalates,
dialkyl terephthalates,
the one or more polymer component(s) being selected from
homopolymers or copolymers which comprise in polymerized form at least one monomer selected from C2-C10-monoolefins, 1,3-butadiene, 2-chloro-1,3-butadiene, vinyl alcohol and its C2-C10-alkyl esters, vinyl chloride, vinylidene chloride, vinylidene fluoride, tetrafluoroethylene, glycidyl acrylate, glycidyl methacrylate, acrylates and methacrylates of C1-C10-alcohols, vinylaromatics, acrylonitrile, methacrylonitrile, maleic anhydride and α,β-ethylenically unsaturated monocarboxylic and dicarboxylic acids,
polyvinyl esters,
polycarbonates,
polyesters,
polyethers,
polyetherketones,
thermoplastic polyurethanes,
polysulfides,
polysulfones,
polyethersulfones,
cellulose alkyl esters,
or mixtures thereof.

13. The polymer composition according to claim 12, further comprising
B2) one or more compound(s) of the general formula (II.a)

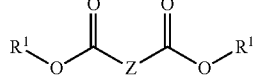

(II.a)

and
B3) one or more compound(s) of the general formula (II.b)

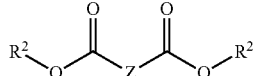

(II.b)

in which

Z is an unbranched or branched $C_2$-$C_8$-alkylene group or is an unbranched or branched $C_2$-$C_8$-alkenylene group, comprising at least one double bond, and $R^1$ is a saturated, unbranched or branched $C_7$-$C_{12}$-alkyl moiety, and $R^2$ is a saturated $C_3$-$C_8$-cycloalkyl moiety, the cycloalkyl moieties mutually independently being either unsubstituted or substituted by at least one $C_1$-$C_{10}$-alkyl moiety.

14. A molding composition comprising a polymer composition as defined in claim 1.

15. A plastisol comprising a polymer composition as defined in claim 1.

16. A method comprising utilizing the polymer composition as defined in claim 1 as plasticizer for thermoplastic polymers and elastomers.

17. A method comprising utilizing the polymer composition as defined in claim 1 in a plastisol.

18. A method comprising utilizing the polymer composition as defined in claim 1 in a molding composition to produce an article.

19. The method as defined in claim 17 for producing moldings and foils.

20. The method according to claim 18,
wherein the article produced is selected from the group consisting of claddings around tools, cycle, scooter and wheelbarrow handles, hoses, water hoses, watering hoses, industrial elastomer hoses, chemistry hoses, claddings for wire or cable, packaging containers, profiles, window profiles, conveyor belts, floor profiles for the exterior, components for vehicle construction, automotive interior outfitting, vehicle bodywork components, underbody protection, vibration dampers, erasers, foamed or unfoamed wall coverings or metal coatings and foils, and wherein the foils are selected from the group consisting of tarpaulins, truck tarpaulins, roof tarpaulins, geomembranes, stadium roofs, tent tarpaulins, seals, self-adhesive foils, laminating foils, shrink-fit foils, floor coverings for the exterior, table covers, adhesive tape foils, coatings, pool foils, pond foils, and artificial leather.

21. The method as defined in claim 19 for producing moldings and foils, wherein the molding and foils may come directly into contact with people or food.

22. The method according to claim 21, the wherein the molding and foils are selected from the group consisting of medical products, hygiene products, food packaging, products for the interior, infant and child products, childcare articles, sports or leisure products, apparel, fibers, and fabrics.

* * * * *